US011863964B2

(12) United States Patent
Kearney et al.

(10) Patent No.: US 11,863,964 B2
(45) **Date of Patent: *Jan. 2, 2024**

(54) AUDIO PROCESSING METHOD AND APPARATUS

(71) Applicant: HUAWEI TECHNOLOGIES CO., LTD., Guangdong (CN)

(72) Inventors: Gavin Kearney, York (GB); Cal Armstrong, York (GB); Bin Wang, Shenzhen (CN); Zexin Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,114

(22) Filed: Aug. 2, 2022

(65) Prior Publication Data

US 2022/0386064 A1 Dec. 1, 2022

Related U.S. Application Data

(63) Continuation of application No. 17/179,619, filed on Feb. 19, 2021, now Pat. No. 11,451,921, which is a (Continued)

(30) Foreign Application Priority Data

Aug. 20, 2018 (CN) ......................... 201810950090.9

(51) Int. Cl.
*H04S 7/00* (2006.01)
*H04R 5/04* (2006.01)
*H04S 3/00* (2006.01)

(52) U.S. Cl.
CPC ............... *H04S 7/303* (2013.01); *H04R 5/04* (2013.01); *H04S 7/305* (2013.01); (Continued)

(58) Field of Classification Search
None
See application file for complete search history.

(56) References Cited

U.S. PATENT DOCUMENTS 6,243,476 B1 6/2001 Gardner
2005/0047618 A1 3/2005 Davis et al.
(Continued)

FOREIGN PATENT DOCUMENTS

CN 1728890 A 2/2006
CN 1860826 A 11/2006
(Continued)

OTHER PUBLICATIONS

Xie Bosun et al., A Simplified Way to Simulate 3D Virtual Sound Image. Audio Engineering, No. 7, 2001, 5 pages.
(Continued)

*Primary Examiner* — Qin Zhu
(74) *Attorney, Agent, or Firm* — WOMBLE BOND DICKINSON (US) LLP

(57) ABSTRACT

M audio signals are obtained by processing an audio signal by M virtual speakers; M first HRTFs and M second HRTFs are obtained, where the M first HRTFs corresponding to a left ear position, and the M second HRTFs corresponding to a right ear position; high-band impulse responses of some of the M first HRTFs are modified to obtain modified first target HRTFs, and high-band impulse responses of some of the M second HRTFs are modified to obtain modified second target HRTFs; a first target audio signal corresponding to the left ear position is obtained based on the modified first target HRTFs and un-modified first HRTFs, and the M audio signals; and a second target audio signal corresponding to the right ear position is obtained based on the modified second HRTFs, un-modified second target HRTFs, and the M audio signals.

20 Claims, 9 Drawing Sheets

Related U.S. Application Data continuation of application No. PCT/CN2019/078780, filed on Mar. 19, 2019.

(52) U.S. Cl.
CPC ....... *H04S 2400/01* (2013.01); *H04S 2400/11* (2013.01); *H04S 2420/01* (2013.01)

(56) References Cited

U.S. PATENT DOCUMENTS

| | | | |
|---|---|---|---|
| 2005/0100171 | A1 | 5/2005 | Reilly et al. |
| 2005/0281408 | A1 | 12/2005 | Kim et al. |
| 2006/0083394 | A1 | 4/2006 | Mcgrath |
| 2010/0303246 | A1 | 12/2010 | Walsh et al. |
| 2012/0243689 | A1 | 9/2012 | Jeong et al. |
| 2014/0064526 | A1 | 3/2014 | Otto et al. |
| 2014/0355765 | A1 | 12/2014 | Kulavik et al. |
| 2016/0012816 | A1 | 1/2016 | Fujisawa |
| 2017/0127210 | A1 | 5/2017 | Nakano |
| 2017/0325045 | A1 | 11/2017 | Baek et al. |

FOREIGN PATENT DOCUMENTS

| | | | |
|---|---|---|---|
| CN | 101529930 | A | 9/2009 |
| CN | 104581610 | A | 4/2015 |
| CN | 105933835 | A | 9/2016 |
| CN | 106664499 | A | 5/2017 |
| CN | 107105384 | A | 8/2017 |
| CN | 107113524 | A | 8/2017 |
| CN | 107182021 | A | 9/2017 |
| CN | 107258090 | A | 10/2017 |
| CN | 107786936 | A | 3/2018 |
| CN | 107925814 | A | 4/2018 |
| CN | 108156575 | A | 6/2018 |
| CN | 108370485 | A | 8/2018 |
| EP | 1551205 | A1 | 7/2005 |
| KR | 20140128567 | A | 11/2014 |

OTHER PUBLICATIONS

Yong Guk Kim et al, A 3D Audio Reproduction Scheme for Audio Delivery on a Stereo Loudspeaker System, Proc. SPIE 6777, Multimedia Systems and Applications X, 67770F, Sep. 10, 2007, XP040248218, total 8 pages.

Cal Armstrong et al., A Bi-RADIAL Approach to Ambisonics. Audio Engineering Society, Presented at the Conference on Audio for Virtual and Augmented Reality, Aug. 20 22, 20180, Redmond, WA, USA, 10 pages.

AUDIO PROCESSING METHOD AND APPARATUS

CROSS-REFERENCE TO RELATED APPLICATIONS

This application is a continuation of U.S. patent application Ser. No. 17/179,619, filed on Feb. 19, 2021, which is a continuation of International Application No. PCT/CN2019/078780, filed on Mar. 19, 2019, which claims priority to Chinese Patent Application No. 201810950090.9, filed on Aug. 20, 2018. All of the afore-mentioned patent applications are hereby incorporated by reference in their entireties.

TECHNICAL FIELD

This application relates to sound processing technologies, and in particular, to an audio processing method and apparatus.

BACKGROUND

With the rapid development of high-performance computers and signal processing technologies, a virtual reality technology has attracted growing attention. An immersive virtual reality system requires not only a stunning visual effect but also a realistic auditory effect. Audio-visual fusion can greatly improve experience of virtual reality. A core of virtual reality audio is a three-dimensional audio technology. Currently, there are a plurality of playback methods (for example, a multi-channel-based method and an object-based method) for implementing three-dimensional audio. However, on an existing virtual reality device, binaural playback based on a multi-channel headset is most commonly used.

A rendered stereo signal in the prior art includes a left channel signal (an audio signal relative to a left ear position) and a right channel signal (an audio signal relative to a right ear position). Both the left channel signal and the right channel signal are obtained by superimposing a plurality of convolved audio signals that are obtained through convolution of audio signals with HRTFs corresponding to all positions, where the audio signals are processed by virtual speakers at the corresponding positions. Crosstalk exists between the left channel signal and the right channel signal obtained by using this method.

SUMMARY

Embodiments of this application provide an audio processing method and apparatus, to reduce crosstalk between a left channel signal and a right channel signal that are output by an audio signal receive end.

According to a first aspect, an embodiment of this application provides an audio processing method, including:

obtaining M first audio signals by processing a to-be-processed audio signal by M virtual speakers, where M is a positive integer, and the M virtual speakers are in a one-to-one correspondence with the M first audio signals;

obtaining M first head-related transfer functions HRTFs and M second HRTFs, where the M first HRTFs are HRTFs to which the M first audio signals correspond from the M virtual speakers to a left ear position, the M second HRTFs are HRTFs to which the M first audio signals correspond from the M virtual speakers to a right ear position, the M first HRTFs are in a one-to-one correspondence with the M virtual speakers, and the M second HRTFs are in a one-to-one correspondence with the M virtual speakers;

modifying high-band impulse responses of a first HRTFs, to obtain a first target HRTFs, and modifying high-band impulse responses of b second HRTFs, to obtain b second target HRTFs, where $1 \le a \le M$, $1 \le b \le M$, and both a and b are integers; and obtaining, based on the a first target HRTFs, c first HRTFs, and the M first audio signals, a first target audio signal corresponding to the current left ear position, and obtaining, based on d second HRTFs, the b second target HRTFs, and the M first audio signals, a second target audio signal corresponding to the current right ear position, where the c first HRTFs are HRTFs other than the a first HRTFs in the M first HRTFs, the d second HRTFs are HRTFs other than the b second HRTFs in the M second HRTFs, $a+c=M$, and $b+d=M$.

In this embodiment, crosstalk between the first target audio signal and the second target audio signal is mainly caused by high bands of the first target audio signal and the second target audio signal. Therefore, modification of the high-band impulse responses of the a first HRTFs can reduce interference caused by the obtained first target audio signal to the second target audio signal. Likewise, modification of the high-band impulse responses of the b second HRTFs can reduce interference caused by the second target audio signal to the first target audio signal. This reduces crosstalk between the first target audio signal corresponding to the left ear position and the second target audio signal corresponding to the right ear position.

In an embodiment, correspondences between a plurality of preset positions and a plurality of HRTFs are prestored, and the obtaining M first HRTFs includes: obtaining M first positions of the M virtual speakers relative to the current left ear position; and determining, based on the M first positions and the correspondences, that M HRTFs corresponding to the M first positions are the M first HRTFs.

According to this embodiment, the M first HRTFs are obtained.

In an embodiment, correspondences between a plurality of preset positions and a plurality of HRTFs are prestored, and the obtaining M second HRTFs includes: obtaining M second positions of the M virtual speakers relative to the current right ear position; and determining, based on the M second positions and the correspondences, that M HRTFs corresponding to the M second positions are the M second HRTFs.

According to this embodiment, the M second HRTFs are obtained.

In an embodiment, the obtaining, based on the a first target HRTFs, c first HRTFs, and the M first audio signals, a first target audio signal corresponding to the current left ear position includes: convolving each of the M first audio signals with a corresponding HRTF in all HRTFs of the a first target HRTFs and the c first HRTFs, to obtain M first convolved audio signals; and obtaining the first target audio signal based on the M first convolved audio signals.

According to this embodiment, the first target audio signal corresponding to the current left ear position, namely, a left channel signal, is obtained.

In an embodiment, the obtaining, based on d second HRTFs, the b second target HRTFs, and the M first audio signals, a second target audio signal corresponding to the current right ear position includes: convolving each of the M first audio signals with a corresponding HRTF in all HRTFs of the d second HRTFs and the b second target HRTFs, to obtain M second convolved audio signals; and obtaining the second target audio signal based on the M second convolved audio signals.

According to this embodiment, the second target audio signal corresponding to the current right ear position, namely, a right channel signal, is obtained.

In an embodiment, the a first HRTFs are a first HRTFs to which a virtual speakers located on a first side of a target center correspond, the first side is a side that is of the target center and that is far away from the current left ear position, and the target center is a center of three-dimensional space corresponding to the M virtual speakers.

In this embodiment, the modifying high-band impulse responses of a first HRTFs, to obtain a first target HRTFs may include the following possible implementations.

In an embodiment, a first modification factor and the high-band impulse responses included in the a first HRTFs are multiplied, to obtain the a first target HRTFs, where the first modification factor is greater than 0 and less than 1.

In this embodiment, a high-band impulse response of a first HRTF corresponding to a virtual speaker that is far away from the current left ear position is modified by using the first modification factor, where the first modification factor is less than 1. It is equivalent that, impact on the second target audio signal caused by a high-band signal in a first audio signal output by the virtual speaker that is far away from the current left ear position (in other words, that is close to the current right ear position) is reduced. This can reduce crosstalk between the first target audio signal and the second target audio signal.

In an embodiment, a first modification factor and the high-band impulse responses included in the a first HRTFs are multiplied, to obtain a third target HRTFs, where the first modification factor is a value greater than 0 and less than 1. Then, a third modification factor and each impulse response included in the a third target HRTFs are multiplied, to obtain the a first target HRTFs, where the third modification factor is a value greater than 1.

In this embodiment, crosstalk between the first target audio signal and the second target audio signal can be reduced. Further, it can be maximally ensured that an order of magnitude of energy of the first target audio signal is the same as an order of magnitude of energy of a third target audio signal obtained based on the M first HRTFs and the M first audio signals.

In a third embodiment, a first modification factor and the high-band impulse responses included in the a first HRTFs are multiplied, to obtain a third target HRTFs, where the first modification factor is a value greater than 0 and less than 1. For one third target HRTF, a first value and all impulse responses included in the one third target HRTF are multiplied, to obtain a first target HRTF corresponding to the one third target HRTF. The first value is a ratio of a first sum of squares to a second sum of squares. The first sum of squares is a sum of squares of all impulse responses included in a first HRTF corresponding to the one third target HRTF, and the second sum of squares is a sum of squares of all impulse responses included in the one third target HRTF.

In this embodiment, crosstalk between the first target audio signal and the second target audio signal can be reduced. Further, it can be ensured that an order of magnitude of energy of the first target audio signal is the same as an order of magnitude of energy of a third target audio signal obtained based on the M first HRTFs and the M first audio signals.

In an embodiment, the b second HRTFs are b second HRTFs to which b virtual speakers located on a second side of the target center correspond, the second side is a side that is of the target center and that is far away from the current right ear position, and the target center is the center of the three-dimensional space corresponding to the M virtual speakers.

In this embodiment, the modifying high-band impulse responses of b second HRTFs, to obtain b second target HRTFs may include the following several possible implementations.

In an embodiment, a second modification factor and the high-band impulse responses included in the b second HRTFs are multiplied, to obtain the b second target HRTFs, where the second modification factor is a value greater than 0 and less than 1.

In this embodiment, a high-band impulse response of a second HRTF corresponding to a virtual speaker that is far away from the current right ear position is modified by using the second modification factor, where the second modification factor is less than 1. It is equivalent that, impact on the first target audio signal caused by a high-band signal in a first audio signal output by the virtual speaker that is far away from the current right ear position (in other words, that is close to the current left ear position) is reduced. This can reduce crosstalk between the first target audio signal and the second target audio signal.

In an embodiment, a second modification factor and the high-band impulse responses included in the b second HRTFs are multiplied, to obtain the b fourth target HRTFs, where the second modification factor is a value greater than 0 and less than 1.

Then, a fourth modification factor and each impulse response included in the b fourth target HRTFs are multiplied, to obtain the b second target HRTFs, where the fourth modification factor is a value greater than 1.

In this embodiment, crosstalk between the first target audio signal and the second target audio signal can be reduced. Further, it can be maximally ensured that an order of magnitude of energy of the second target audio signal is the same as an order of magnitude of energy of a fourth target audio signal obtained based on the M second HRTFs and the M first audio signals.

In an embodiment, a second modification factor and the high-band impulse responses included in the b second HRTFs are multiplied, to obtain the b fourth target HRTFs, where the second modification factor is a value greater than 0 and less than 1.

For one fourth target HRTF, a second value and all impulse responses included in the one fourth target HRTF are multiplied, to obtain a second target HRTF corresponding to the one fourth target HRTF, where the second value is a ratio of a third sum of squares to a fourth sum of squares. The third sum of squares is a sum of squares of all impulse responses included in a second HRTF corresponding to the one fourth target HRTF, and the fourth sum of squares is a sum of squares of all impulse responses included in the one fourth target HRTF.

In this embodiment, crosstalk between the first target audio signal and the second target audio signal can be reduced. Further, it can be ensured that an order of magnitude of energy of the second target audio signal is the same as an order of magnitude of energy of a fourth target audio signal obtained based on the M second HRTFs and the M first audio signals.

In an embodiment, $a=a_1+a_2$. The $a_1$ first HRTFs are $a_1$ first HRTFs to which $a_1$ virtual speakers located on a first side of a target center correspond, and the $a_2$ first HRTFs are $a_2$ first HRTFs to which $a_2$ virtual speakers located on a second side of the target center correspond. The first side is a side that is of the target center and that is far away from the current left ear position, and the second side is a side that is of the target center and that is far away from the current right ear position. The target center is a center of three-dimensional space corresponding to the M virtual speakers.

In an embodiment, the modifying high-band impulse responses of a first HRTFs, to obtain a first target HRTFs may include the following possible implementations.

In an embodiment, a first modification factor and high-band impulse responses of the $a_1$ first HRTFs are multiplied, to obtain $a_1$ third target HRTFs, and a fifth modification factor and high-band impulse responses of the $a_2$ first HRTFs are multiplied, to obtain $a_2$ fifth target HRTFs. The a first target HRTFs include the $a_1$ third target HRTFs and the $a_2$ fifth target HRTFs.

A product of the first modification factor and the fifth modification factor is 1, and the first modification factor is a value greater than 0 and less than 1.

In this embodiment, a high-band impulse response of a first HRTF corresponding to a virtual speaker that is far away from the current left ear position is modified by using the first modification factor. In addition, a high-band impulse response of a first HRTF corresponding to a virtual speaker that is close to the current left ear position is modified by using the fifth modification factor. The first modification factor is inversely proportional to the fifth modification factor. It is equivalent that, impact on the second target audio signal caused by a high-band signal in a first audio signal output by the virtual speaker that is far away from the current left ear position (in other words, that is close to the current right ear position) is reduced; and impact on the first target audio signal caused by a high-band signal in a first audio signal output by the virtual speaker that is close to the current left ear position (in other words, that is far away from the current right ear position) is enhanced. This can further reduce crosstalk between the first target audio signal and the second target audio signal.

In an embodiment, a first modification factor and high-band impulse responses of the $a_1$ first HRTFs are multiplied, to obtain $a_1$ third target HRTFs, and a fifth modification factor and high-band impulse responses of the $a_2$ first HRTFs are multiplied, to obtain $a_2$ fifth target HRTFs. A product of the first modification factor and the fifth modification factor is 1, and the first modification factor is a value greater than 0 and less than 1.

Then, a third modification factor and each impulse response included in the $a_1$ third target HRTFs are multiplied, to obtain $a_1$ sixth target HRTFs, and a sixth modification factor and each impulse response included in the $a_2$ fifth target HRTFs are multiplied, to obtain $a_2$ seventh target HRTFs. The a first target HRTFs include the $a_1$ sixth target HRTFs and the $a_2$ seventh target HRTFs. The third modification factor is a value greater than 1, and the sixth modification factor is a value greater than 0 and less than 1.

In this embodiment, crosstalk between the first target audio signal and the second target audio signal can be further reduced. Further, it can be maximally ensured that an order of magnitude of energy of the first target audio signal is the same as an order of magnitude of energy of a third target audio signal obtained based on the M first HRTFs and the M first audio signals.

In an embodiment, a first modification factor and high-band impulse responses of the $a_1$ first HRTFs are multiplied, to obtain $a_1$ third target HRTFs, and a fifth modification factor and high-band impulse responses of the $a_2$ first HRTFs are multiplied, to obtain $a_2$ fifth target HRTFs. A product of the first modification factor and the fifth modification factor is 1, and the first modification factor is a value greater than 0 and less than 1.

For one third target HRTF, a first value and all impulse responses included in the one third target HRTF are multiplied, to obtain a sixth target HRTF corresponding to the one third target HRTF. The first value is a ratio of a first sum of squares to a second sum of squares. The first sum of squares is a sum of squares of all impulse responses included in a first HRTF corresponding to the one third target HRTF, and the second sum of squares is a sum of squares of all impulse responses included in the one third target HRTF. For one fifth target HRTF, a third value and all impulse responses included in the one fifth target HRTF are multiplied, to obtain a seventh target HRTF corresponding to the one fifth target HRTF. The third value is a ratio of a fifth sum of squares to a sixth sum of squares. The fifth sum of squares is a sum of squares of all impulse responses included in a first HRTF corresponding to the one fifth target HRTF, and the sixth sum of squares is a sum of squares of all impulse responses included in the one fifth target HRTF. The a first target HRTFs include the $a_1$ sixth target HRTFs and $a_2$ seventh target HRTFs.

In this embodiment, crosstalk between the first target audio signal and the second target audio signal can be further reduced. Further, it can be ensured that an order of magnitude of energy of the first target audio signal is the same as an order of magnitude of energy of a third target audio signal obtained based on the M first HRTFs and the M first audio signals.

In an embodiment, $b=b_1+b_2$. The $b_1$ second HRTFs are $b_1$ second HRTFs to which $b_1$ virtual speakers located on the second side of the target center correspond, and the $b_2$ second HRTFs are $b_2$ second HRTFs to which $b_2$ virtual speakers located on the first side of the target center correspond. The first side is a side that is of the target center and that is far away from the current left ear position, and the second side is a side that is of the target center and that is far away from the current right ear position. The target center is the center of the three-dimensional space corresponding to the M virtual speakers.

In this embodiment, the modifying high-band impulse responses of b second HRTFs, to obtain b second target HRTFs includes the following several possible implementations.

In an embodiment, a second modification factor and high-band impulse responses of the $b_1$ second HRTFs are multiplied, to obtain $b_1$ fourth target HRTFs, and a seventh modification factor and high-band impulse responses of the $b_2$ second HRTFs are multiplied, to obtain $b_2$ eighth target HRTFs. The b second target HRTFs include the $b_1$ fourth target HRTFs and the $b_2$ eighth target HRTFs.

A product of the second modification factor and the seventh modification factor is 1, and the second modification factor is a value greater than 0 and less than 1.

In this embodiment, a high-band impulse response of a second HRTF corresponding to a virtual speaker that is far away from the right ear is modified by using the second modification factor. In addition, a high-band impulse response of a second HRTF corresponding to a virtual speaker that is close to the right ear is modified by using the seventh modification factor. The second modification factor is inversely proportional to the seventh modification factor. It is equivalent that, impact on the second target audio signal caused by a high-band signal in a first audio signal output by the virtual speaker that is far away from the current right ear position (in other words, that is close to the current left ear position) is reduced; and impact on the second target audio signal caused by a high-band signal in a first audio signal output by the virtual speaker that is close to the current right ear position (in other words, that is far away the current left ear position) is enhanced. This can further reduce crosstalk between the first target audio signal and the second target audio signal.

In an embodiment, a second modification factor and high-band impulse responses of the $b_1$ second HRTFs are multiplied, to obtain $b_1$ fourth target HRTFs, and a seventh modification factor and high-band impulse responses of the $b_2$ second HRTFs are multiplied, to obtain $b_2$ eighth target HRTFs. A product of the second modification factor and the seventh modification factor is 1, and the second modification factor is a value greater than 0 and less than 1.

Then, a fourth modification factor and each impulse response included in the $b_1$ fourth target HRTFs are multiplied, to obtain $b_1$ ninth target HRTFs, and an eighth modification factor and each impulse response included in the $b_2$ eighth target HRTFs are multiplied, to obtain $b_2$ tenth target HRTFs. The b second target HRTFs include the $b_1$ ninth target HRTFs and the $b_2$ tenth target HRTFs. The fourth modification factor is a value greater than 1, and the eighth modification factor is a value greater than 0 and less than 1.

In this embodiment, crosstalk between the first target audio signal and the second target audio signal can be further reduced. Further, it can be maximally ensured that an order of magnitude of energy of the second target audio signal is the same as an order of magnitude of energy of a fourth target audio signal obtained based on the M second HRTFs and the M first audio signals.

In an embodiment, a second modification factor and high-band impulse responses of the $b_1$ second HRTFs are multiplied, to obtain $b_1$ fourth target HRTFs, and a seventh modification factor and high-band impulse responses of the $b_2$ second HRTFs are multiplied, to obtain $b_2$ eighth target HRTFs. A product of the second modification factor and the seventh modification factor is 1, and the second modification factor is a value greater than 0 and less than 1.

For one fourth target HRTF, a second value and all impulse responses included in the one fourth target HRTF are multiplied, to obtain a ninth target HRTF corresponding to the one fourth target HRTF. The second value is a ratio of a third sum of squares to a fourth sum of squares. The third sum of squares is a sum of squares of all impulse responses included in a second HRTF corresponding to the one fourth target HRTF, and the fourth sum of squares is a sum of squares of all impulse responses included in the one fourth target HRTF. For one eighth target HRTF, a fourth value and all impulse responses included in the one eighth target HRTF are multiplied, to obtain a tenth target HRTF corresponding to the one eighth target HRTF. The fourth value is a ratio of a seventh sum of squares to an eighth sum of squares. The seventh sum of squares is a sum of squares of all impulse responses included in a second HRTF corresponding to the one eighth target HRTF, and the eighth sum of squares is a sum of squares of all impulse responses included in the one eighth target HRTF. The b second target HRTFs include the $b_1$ ninth target HRTFs and $b_2$ tenth target HRTFs.

In this embodiment, crosstalk between the first target audio signal and the second target audio signal can be further reduced. Further, it can be ensured that an order of magnitude of energy of the second target audio signal is the same as an order of magnitude of energy of a fourth target audio signal obtained based on the M second HRTFs and the M first audio signals.

In an embodiment, the method further includes: adjusting an order of magnitude of energy of the first target audio signal to a first order of magnitude, where the first order of magnitude is an order of magnitude of energy of the third target audio signal, and the third target audio signal is obtained based on the M first HRTFs and the M first audio signals; and adjust an order of magnitude of energy of the second target audio signal to a second order of magnitude, where the second order of magnitude is an order of magnitude of energy of the fourth target audio signal, and the fourth target audio signal is obtained based on the M second HRTFs and the M first audio signals.

In this embodiment, the order of magnitude of energy of the first target audio signal is the same as the order of magnitude of energy of the third target audio signal, and the order of magnitude of energy of the second target audio signal is the same as the order of magnitude of energy of the fourth target audio signal.

According to a second aspect, an embodiment of this application provides an audio processing apparatus, including:

a processing module, configured to obtain M first audio signals by processing a to-be-processed audio signal by M virtual speakers, where M is a positive integer, and the M virtual speakers are in a one-to-one correspondence with the M first audio signals;

an obtaining module, configured to obtain M first head-related transfer functions HRTFs and M second HRTFs, where the M first HRTFs are HRTFs to which the M first audio signals correspond from the M virtual speakers to a left ear position, the M second HRTFs are HRTFs to which the M first audio signals correspond from the M virtual speakers to a right ear position, the M first HRTFs are in a one-to-one correspondence with the M virtual speakers, and the M second HRTFs are in a one-to-one correspondence with the M virtual speakers; and a modification module, configured to modify high-band impulse responses of a first HRTFs, to obtain a first target HRTFs, and modify high-band impulse responses of b second HRTFs, to obtain b second target HRTFs, where $1 \le a \le M$, $1 \le b \le M$, and both a and b are integers; where the obtaining module is further configured to: obtain, based on the a first target HRTFs, c first HRTFs, and the M first audio signals, a first target audio signal corresponding to the current left ear position; and obtain, based on d second HRTFs, the b second target HRTFs, and the M first audio signals, a second target audio signal corresponding to the current right ear position. The c first HRTFs are HRTFs other than the a first HRTFs in the M first HRTFs, and the d second HRTFs are HRTFs other than the b second HRTFs in the M second HRTFs. $a+c=M$, and $b+d=M$.

In an embodiment, the obtaining module is configured to:

obtain M first positions of the M virtual speakers relative to the current left ear position; and determine, based on the M first positions and correspondences, that M HRTFs corresponding to the M first positions are the M first HRTFs, where the correspondences are prestored correspondences between a plurality of preset positions and a plurality of HRTFs.

In an embodiment, the obtaining module is configured to:

obtain M second positions of the M virtual speakers relative to the current right ear position; and determine, based on the M second positions and the correspondences, that M HRTFs corresponding to the M second positions are the M second HRTFs, where the correspondences are prestored correspondences between a plurality of preset positions and a plurality of HRTFs.

In an embodiment, the obtaining module is configured to:

convolve each of the M first audio signals with a corresponding HRTF in all HRTFs of the a first target HRTFs and the c first HRTFs, to obtain M first convolved audio signals; and obtain the first target audio signal based on the M first convolved audio signals.

In an embodiment, the obtaining module is configured to:

convolve each of the M first audio signals with a corresponding HRTF in all HRTFs of the d second HRTFs and the b second target HRTFs, to obtain M second convolved audio signals; and obtain the second target audio signal based on the M second convolved audio signals.

In an embodiment, the a first HRTFs are a first HRTFs to which a virtual speakers located on a first side of a target center correspond, the first side is a side that is of the target center and that is far away from the current left ear position, and the target center is a center of three-dimensional space corresponding to the M virtual speakers.

In an embodiment, the modification module is configured to:

multiply a first modification factor and the high-band impulse responses included in the a first HRTFs, to obtain the a first target HRTFs, where the first modification factor is greater than 0 and less than 1.

In an embodiment, the modification module is configured to:

multiply a first modification factor and the high-band impulse responses included in the a first HRTFs, to obtain a third target HRTFs, where the first modification factor is a value greater than 0 and less than 1; and multiply a third modification factor and each impulse response included in the a third target HRTFs, to obtain the a first target HRTFs, where the third modification factor is a value greater than 1;

or multiply a first modification factor and the high-band impulse responses included in the a first HRTFs, to obtain a third target HRTFs, where the first modification factor is a value greater than 0 and less than 1; and for one third target HRTF, multiply a first value and all impulse responses included in the one third target HRTF, to obtain a first target HRTF corresponding to the one third target HRTF, where the first value is a ratio of a first sum of squares to a second sum of squares, the first sum of squares is a sum of squares of all impulse responses included in a first HRTF corresponding to the one third target HRTF, and the second sum of squares is a sum of squares of all impulse responses included in the one third target HRTF.

In an embodiment, the b second HRTFs are b second HRTFs to which b virtual speakers located on a second side of the target center correspond, the second side is a side that is of the target center and that is far away from the current right ear position, and the target center is the center of the three-dimensional space corresponding to the M virtual speakers.

In an embodiment, the modification module is configured to:

multiply a second modification factor and the high-band impulse responses included in the b second HRTFs, to obtain the b second target HRTFs, where the second modification factor is a value greater than 0 and less than 1.

In an embodiment, the modification module is configured to:

multiply a second modification factor and the high-band impulse responses included in the b second HRTFs, to obtain the b fourth target HRTFs, where the second modification factor is a value greater than 0 and less than 1; and multiply a fourth modification factor and each impulse response included in the b fourth target HRTFs, to obtain the b second target HRTFs, where the fourth modification factor is a value greater than 1;

or multiply a second modification factor and the high-band impulse responses included in the b second HRTFs, to obtain the b fourth target HRTFs, where the second modification factor is a value greater than 0 and less than 1; and for one fourth target HRTF, multiply a second value and all impulse responses included in the one fourth target HRTF, to obtain a second target HRTF corresponding to the one fourth target HRTF, where the second value is a ratio of a third sum of squares to a fourth sum of squares, the third sum of squares is a sum of squares of all impulse responses included in a second HRTF corresponding to the one fourth target HRTF, and the fourth sum of squares is a sum of squares of all impulse responses included in the one fourth target HRTF.

In an embodiment, $a=a_1+a_2$. The $a_1$ first HRTFs are $a_1$ first HRTFs to which $a_1$ virtual speakers located on a first side of a target center correspond, and the $a_2$ first HRTFs are $a_2$ first HRTFs to which $a_2$ virtual speakers located on a second side of the target center correspond. The first side is a side that is of the target center and that is far away from the current left ear position, and the second side is a side that is of the target center and that is far away from the current right ear position. The target center is a center of three-dimensional space corresponding to the M virtual speakers.

In an embodiment, the modification module is configured to:

multiply a first modification factor and high-band impulse responses of the $a_1$ first HRTFs, to obtain $a_1$ third target HRTFs, and multiply a fifth modification factor and high-band impulse responses of the $a_2$ first HRTFs, to obtain $a_2$ fifth target HRTFs, where the a first target HRTFs include the $a_1$ third target HRTFs and the $a_2$ fifth target HRTFs.

A product of the first modification factor and the fifth modification factor is 1, and the first modification factor is a value greater than 0 and less than 1.

In an embodiment, the modification module is configured to:

multiply a first modification factor and high-band impulse responses of the $a_1$ first HRTFs, to obtain $a_1$ third target HRTFs, and multiply a fifth modification factor and high-band impulse responses of the $a_2$ first HRTFs, to obtain $a_2$ fifth target HRTFs, where a product of the first modification factor and the fifth modification factor is 1, and the first modification factor is a value greater than 0 and less than 1; and multiply a third modification factor and each impulse response included in the $a_1$ third target HRTFs, to obtain $a_1$ sixth target HRTFs, and multiply a sixth modification factor and each impulse response included in the $a_2$ fifth target HRTFs, to obtain $a_2$ seventh target HRTFs, where the a first target HRTFs include the $a_1$ sixth target HRTFs and the $a_2$ seventh target HRTFs, the third modification factor is a value greater than 1, and the sixth modification factor is a value greater than 0 and less than 1;

or multiply a first modification factor and high-band impulse responses of the $a_1$ first HRTFs, to obtain $a_1$ third target HRTFs, and multiply a fifth modification factor and high-band impulse responses of the $a_2$ first HRTFs, to obtain $a_2$ fifth target HRTFs, where a product of the first modification factor and the fifth modification factor is 1, and the first modification factor is a value greater than 0 and less than 1; and for one third target HRTF, multiply a first value and all impulse responses included in the one third target HRTF, to obtain a sixth target HRTF corresponding to the one third target HRTF, where the first value is a ratio of a first sum of squares to a second sum of squares, the first sum of squares is a sum of squares of all impulse responses included in a first HRTF corresponding to the one third target HRTF, and the second sum of squares is a sum of squares of all impulse responses included in the one third target HRTF; and for one fifth target HRTF, multiply a third value and all impulse responses included in the one fifth target HRTF, to obtain a seventh target HRTF corresponding to the one fifth target HRTF, where the third value is a ratio of a fifth sum of squares to a sixth sum of squares, the fifth sum of squares is a sum of squares of all impulse responses included in a first HRTF corresponding to the one fifth target HRTF, and the sixth sum of squares is a sum of squares of all impulse responses included in the one fifth target HRTF; and the a first target HRTFs include the $a_1$ sixth target HRTFs and $a_2$ seventh target HRTFs.

In an embodiment, $b=b_1+b_2$. The $b_1$ second HRTFs are $b_1$ second HRTFs to which $b_1$ virtual speakers located on the second side of the target center correspond, and the $b_2$ second HRTFs are $b_2$ second HRTFs to which $b_2$ virtual speakers located on the first side of the target center correspond. The first side is a side that is of the target center and that is far away from the current left ear position, and the second side is a side that is of the target center and that is far away from the current right ear position. The target center is the center of the three-dimensional space corresponding to the M virtual speakers.

In an embodiment, the modification module is configured to:

multiply a second modification factor and high-band impulse responses of the $b_1$ second HRTFs, to obtain $b_1$ fourth target HRTFs, and multiply a seventh modification factor and high-band impulse responses of the $b_2$ second HRTFs, to obtain $b_2$ eighth target HRTFs, where the b second target HRTFs include the $b_1$ fourth target HRTFs and the $b_2$ eighth target HRTFs.

A product of the second modification factor and the seventh modification factor is 1, and the second modification factor is a value greater than 0 and less than 1.

In an embodiment, the modification module is configured to:

multiply a second modification factor and high-band impulse responses of the $b_1$ second HRTFs, to obtain $b_1$ fourth target HRTFs, and multiply a seventh modification factor and high-band impulse responses of the $b_2$ second HRTFs, to obtain $b_2$ eighth target HRTFs, where a product of the second modification factor and the seventh modification factor is 1, and the second modification factor is a value greater than 0 and less than 1; and multiply a fourth modification factor and each impulse response included in the $b_1$ fourth target HRTFs, to obtain $b_1$ ninth target HRTFs, and multiply an eighth modification factor and each impulse response included in the $b_2$ eighth target HRTFs, to obtain $b_2$ tenth target HRTFs, where the b second target HRTFs include the $b_1$ ninth target HRTFs and the $b_2$ tenth target HRTFs, the fourth modification factor is a value greater than 1, and the eighth modification factor is a value greater than 0 and less than 1;

or multiply a second modification factor and high-band impulse responses of the $b_1$ second HRTFs, to obtain $b_1$ fourth target HRTFs, and multiply a seventh modification factor and high-band impulse responses of the $b_2$ second HRTFs, to obtain $b_2$ eighth target HRTFs, where a product of the second modification factor and the seventh modification factor is 1, and the second modification factor is a value greater than 0 and less than 1; and for one fourth target HRTF, multiply a second value and all impulse responses included in the one fourth target HRTF, to obtain a ninth target HRTF corresponding to the one fourth target HRTF, where the second value is a ratio of a third sum of squares to a fourth sum of squares, the third sum of squares is a sum of squares of all impulse responses included in a second HRTF corresponding to the one fourth target HRTF, and the fourth sum of squares is a sum of squares of all impulse responses included in the one fourth target HRTF; and for one eighth target HRTF, multiply a fourth value and all impulse responses included in the one eighth target HRTF, to obtain a tenth target HRTF corresponding to the one eighth target HRTF, where the fourth value is a ratio of a seventh sum of squares to an eighth sum of squares, the seventh sum of squares is a sum of squares of all impulse responses included in a second HRTF corresponding to the one eighth target HRTF, and the eighth sum of squares is a sum of squares of all impulse responses included in the one eighth target HRTF; and the b second target HRTFs include the $b_1$ ninth target HRTFs and $b_2$ tenth target HRTFs.

In an embodiment, the apparatus further includes an adjustment module, configured to:

adjust an order of magnitude of energy of the first target audio signal to a first order of magnitude, where the first order of magnitude is an order of magnitude of energy of the third target audio signal, and the third target audio signal is obtained based on the M first HRTFs and the M first audio signals; and adjust an order of magnitude of energy of the second target audio signal to a second order of magnitude, where the second order of magnitude is an order of magnitude of energy of the fourth target audio signal, and the fourth target audio signal is obtained based on the M second HRTFs and the M first audio signals.

According to a third aspect, an embodiment of this application provides an audio processing apparatus, including a processor, where the processor is configured to: be coupled to a memory, and read and execute an instruction in the memory, to implement the method according to any one of the possible designs of the first aspect.

In an embodiment, the memory is further included.

According to a fourth aspect, an embodiment of this application provides a readable storage medium. The readable storage medium stores a computer program, and when the computer program is executed, the method according to any one of the possible designs of the first aspect is implemented.

According to a fifth aspect, an embodiment of this application provides a computer program product. When the computer program is executed, the method according to any one of the possible designs of the first aspect is implemented.

In this application, the high-band impulse responses of the a first HRTFs are modified, so that interference caused by the obtained first target audio signal to the second target audio signal can be reduced. In addition, the high-band impulse responses of the b second HRTFs are modified, so that interference caused by the second target audio signal to the first target audio signal can be reduced. This reduces crosstalk between the first target audio signal corresponding to the left ear position and the second target audio signal corresponding to the right ear position.

DESCRIPTION OF EMBODIMENTS

Related technical terms in this application are first explained:

Head-related transfer function (HRTF for short): A sound wave sent by a sound source reaches two ears after being scattered by the head, an auricle, the trunk, and the like. A physical process of transmitting the sound wave from the sound source to the two ears may be considered as a linear time-invariant acoustic filtering system, and features of the process may be described by using the HRTF. In other words, the HRTF describes the process of transmitting the sound wave from the sound source to the two ears. A more vivid explanation is as follows: If an audio signal sent by the sound source is X, and a corresponding audio signal after the audio signal X is transmitted to a preset position is Y, $X*Z=Y$ (convolution of X and Z is equal to Y), where Z is the HRTF.

In the embodiments, a preset position in correspondences between a plurality of preset positions and a plurality of HRTFs may be a position relative to a left ear position. In this case, the plurality of HRTFs are a plurality of HRTFs centered at the left ear position. Alternatively, in the embodiments, a preset position in correspondences between a plurality of preset positions and a plurality of HRTFs may be a position relative to a right ear position. In this case, the plurality of HRTFs are a plurality of HRTFs centered at the right ear position. Alternatively, in the embodiments, a preset position in correspondences between a plurality of preset positions and a plurality of HRTFs may be a position relative to a head center position. In this case, the plurality of HRTFs are a plurality of HRTFs centered at the head center.

Figure 1:
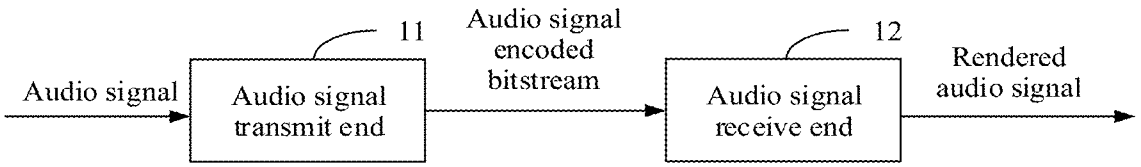
FIG. 1 is a schematic structural diagram of an audio signal system according to an embodiment of this application.

FIG. 1 is a schematic structural diagram of an audio signal system according to an embodiment of this application. The audio signal system includes an audio signal transmit end 11 and an audio signal receive end 12.

The audio signal transmit end 11 is configured to collect and encode a signal sent by a sound source, to obtain an audio signal encoded bitstream. After obtaining the audio signal encoded bitstream, the audio signal receive end 12 decodes the audio signal encoded bitstream, to obtain a decoded audio signal; and then renders the decoded audio signal to obtain a rendered audio signal.

In an embodiment, the audio signal transmit end 11 may be connected to the audio signal receive end 12 in a wired or wireless manner.

Figure 2:
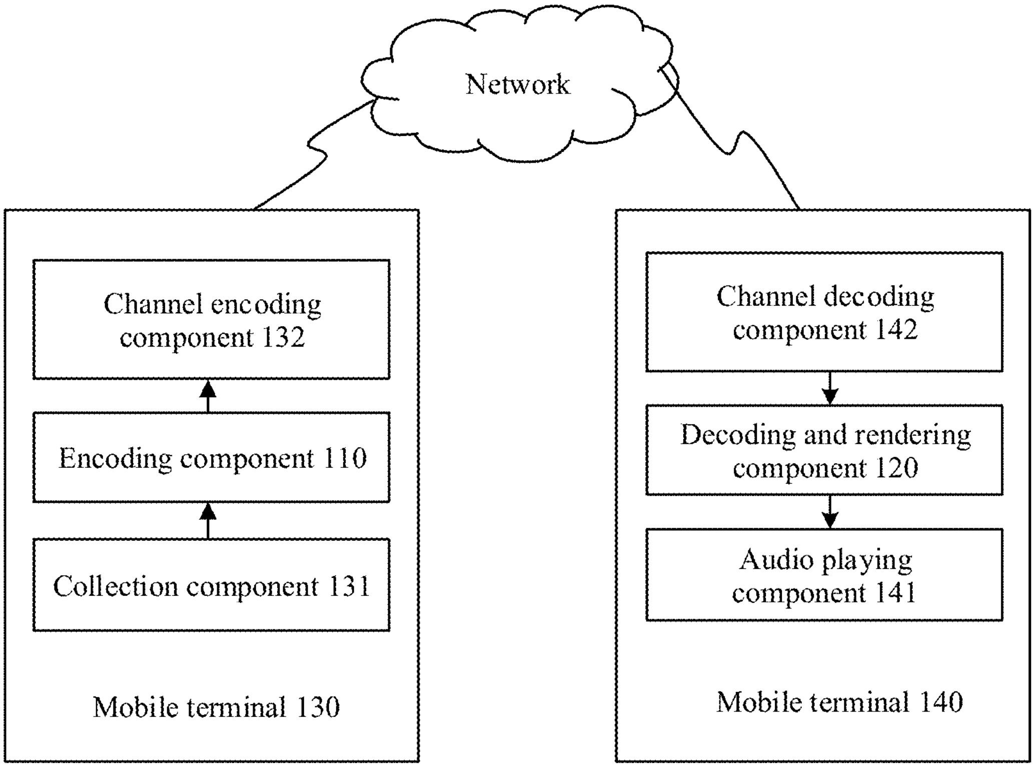
FIG. 2 is a diagram of a system architecture according to an embodiment of this application.

FIG. 2 is a diagram of a system architecture according to an embodiment of this application. As shown in FIG. 2, the system architecture includes a mobile terminal 130 and a mobile terminal 140. The mobile terminal 130 may be an audio signal transmit end, and the mobile terminal 140 may be an audio signal receive end.

The mobile terminal 130 and the mobile terminal 140 may be electronic devices that are independent of each other and that have an audio signal processing capability. For example, the mobile terminal 130 and the mobile terminal 140 may be mobile phones, wearable devices, virtual reality (virtual reality, VR) devices, augmented reality (AR) devices, or the like. The mobile terminal 130 is connected to the mobile terminal 140 through a wireless or wired network.

In an embodiment, the mobile terminal 130 may include a collection component 131, an encoding component 110, and a channel encoding component 132. The collection component 131 is connected to the encoding component 110, and the encoding component 110 is connected to the channel encoding component 132.

In an embodiment, the mobile terminal 140 may include an audio playing component 141, a decoding and rendering component 120, and a channel decoding component 142. The audio playing component 141 is connected to the decoding and rendering component 120, and the decoding and rendering component 120 is connected to the channel decoding component 142.

After collecting an audio signal through the collection component 131, the mobile terminal 130 encodes the audio signal through the encoding component 110, to obtain an audio signal encoded bitstream; and then, encodes the audio signal encoded bitstream through the channel encoding component 132, to obtain a transmission signal.

The mobile terminal 130 sends the transmission signal to the mobile terminal 140 through the wireless or wired network.

After receiving the transmission signal, the mobile terminal 140 decodes the transmission signal through the channel decoding component 142, to obtain the audio signal encoded bitstream; decodes the audio signal encoded bitstream through the decoding and rendering component 120, to obtain a to-be-processed audio signal, and renders the to-be-processed audio signal through the decoding and rendering component 120, to obtain a rendered audio signal; and plays the rendered audio signal through the audio playing component. It may be understood that the mobile terminal 130 may alternatively include the components included in the mobile terminal 140, and the mobile terminal 140 may alternatively include the components included in the mobile terminal 130.

In addition, the mobile terminal 140 may further include an audio playing component, a decoding component, a rendering component, and a channel decoding component. The channel decoding component is connected to the decoding component, the decoding component is connected to the rendering component, and the rendering component is connected to the audio playing component. In this case, after receiving the transmission signal, the mobile terminal 140 decodes the transmission signal through the channel decoding component, to obtain the audio signal encoded bitstream; decodes the audio signal encoded bitstream through the decoding component, to obtain a to-be-processed audio signal; renders the to-be-processed audio signal through the rendering component, to obtain a rendered audio signal; and plays the rendered audio signal through the audio playing component.

Figure 3:
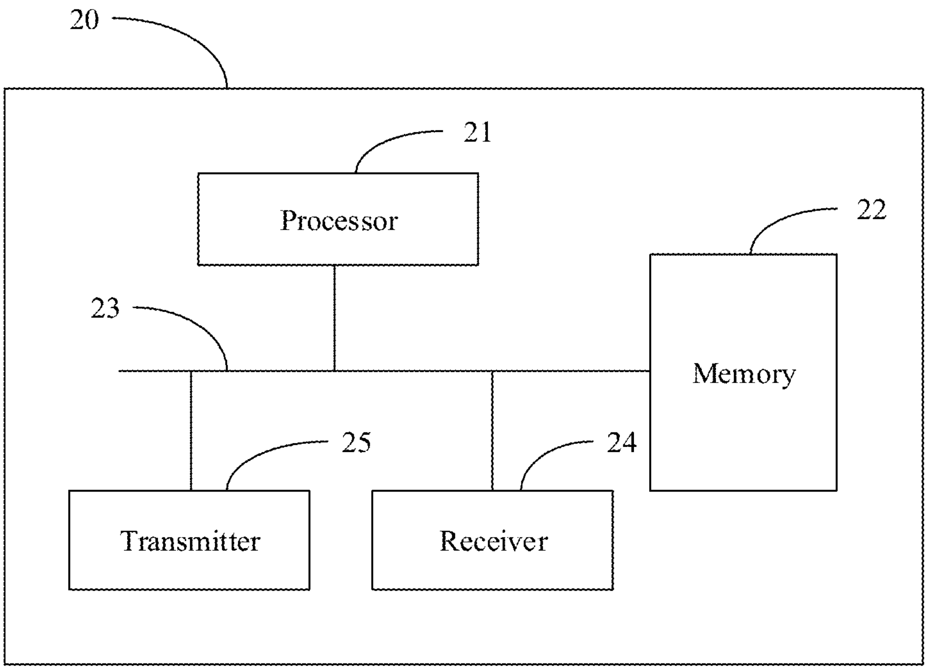
FIG. 3 is a structural block diagram of an audio signal receiving apparatus according to an embodiment of this application.

FIG. 3 is a structural block diagram of an audio signal receiving apparatus according to an embodiment of this application. Referring to FIG. 3, an audio signal receiving apparatus 20 in this embodiment of this application may include at least one processor 21, a memory 22, at least one communications bus 23, a receiver 24, and a transmitter 25. The communications bus 203 is used for connection and communication between the processor 21, the memory 22, the receiver 24, and the transmitter 25. The processor 21 may include a signal decoding component, a decoding component, and a rendering component.

Specifically, the memory 22 may be any one or any combination of the following storage media: a solid-state drive (SSD), a mechanical hard disk, a magnetic disk, a magnetic disk array, or the like, and can provide an instruction and data for the processor 21.

The memory 22 is configured to store at least one of the following correspondences between a plurality of preset positions and a plurality of HRTFs: (1) a plurality of positions relative to a left ear position, and HRTFs that are centered at the left ear position and that correspond to the positions relative to the left ear position; (2) a plurality of positions relative to a right ear position, and HRTFs that are centered at the right ear position and that correspond to the positions relative to the right ear position; (3) a plurality of positions relative to a head center, and HRTFs that are centered at the head center and that correspond to the positions relative to the head center.

Optionally, the memory 22 is further configured to store the following elements: an operating system and an application program module.

The operating system may include various system programs, and is configured to implement various basic services and process a hardware-based task. The application program module may include various application programs, and is configured to implement various application services.

The processor 21 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors or a combination of a DSP and a microprocessor. The general-purpose processor may be a microprocessor, or the processor may be any conventional processor or the like.

The receiver 24 is configured to receive an audio signal from an audio signal sending apparatus.

The processor may invoke a program or the instruction and data stored in the memory 22, to perform the following operations: performing channel decoding on the received audio signal to obtain an audio signal encoded bitstream (this operation may be implemented by a channel decoding component of the processor); and further decoding the audio signal encoded bitstream (this operation may be implemented by a decoding component of the processor), to obtain a to-be-processed audio signal.

After obtaining the to-be-processed signal, the processor 21 is configured to obtain M first audio signals by processing the to-be-processed audio signal by M virtual speakers, where the M virtual speakers are in a one-to-one correspondence with the M first audio signals, and M is a positive integer;

obtain M first head-related transfer functions HRTFs and M second HRTFs, where the M first HRTFs are HRTFs to which the M first audio signals correspond from the M virtual speakers to the left ear position, the M second HRTFs are HRTFs to which the M first audio signals correspond from the M virtual speakers to the right ear position, the M first HRTFs are in a one-to-one correspondence with the M virtual speakers, and the M second HRTFs are in a one-to-one correspondence with the M virtual speakers;

modify high-band impulse responses of a first HRTFs, to obtain a first target HRTFs, and modify high-band impulse responses of b second HRTFs, to obtain b second target HRTFs, where $1 \le a \le M$, $1 \le b \le M$, and both a and b are integers; and obtain, based on the a first target HRTFs, c first HRTFs, and the M first audio signals, a first target audio signal corresponding to the current left ear position, and obtain, based on d second HRTFs, the b second target HRTFs, and the M first audio signals, a second target audio signal corresponding to the current right ear position, where the c first HRTFs are HRTFs other than the a first HRTFs in the M first HRTFs, the d second HRTFs are HRTFs other than the b second HRTFs in the M second HRTFs, $a+c=M$, and $b+d=M$.

The processor 21 is configured to: obtain M first positions of the M virtual speakers relative to the current left ear position; and determine, based on the M first positions and the correspondences stored in the memory 22, that M HRTFs corresponding to the M first positions are the M first HRTFs.

The processor 21 is configured to: obtain M second positions of the M virtual speakers relative to the current right ear position; and determine, based on the M second positions and the correspondences stored in the memory 22, that M HRTFs corresponding to the M second positions are the M second HRTFs.

The processor 21 is further configured to: convolve each of the M first audio signals with a corresponding HRTF in all HRTFs of the a first target HRTFs and the c first HRTFs, to obtain M first convolved audio signals; and obtain the first target audio signal based on the M first convolved audio signals.

The processor 21 is further configured to: convolve each of the M first audio signals with a corresponding HRTF in all HRTFs of the d second HRTFs and the b second target HRTFs, to obtain M second convolved audio signals; and obtain the second target audio signal based on the M second convolved audio signals.

It is assumed that the a first HRTFs are a first HRTFs to which a virtual speakers located on a first side of a target center correspond, the first side is a side that is of the target center and that is far away from the current left ear position, and the target center is a center of three-dimensional space corresponding to the M virtual speakers.

In this case, the processor 21 is further configured to multiply a first modification factor and the high-band impulse responses included in the a first HRTFs, to obtain the a first target HRTFs, where the first modification factor is greater than 0 and less than 1.

The processor 21 is further configured to: multiply a first modification factor and the high-band impulse responses included in the a first HRTFs, to obtain a third target HRTFs, where the first modification factor is a value greater than 0 and less than 1; and multiply a third modification factor and each impulse response included in the a third target HRTFs, to obtain the a first target HRTFs, where the third modification factor is a value greater than 1.

The processor 21 is further configured to: multiply a first modification factor and the high-band impulse responses included in the a first HRTFs, to obtain a third target HRTFs, where the first modification factor is a value greater than 0 and less than 1; and for one third target HRTF, multiply a first value and all impulse responses included in the one third target HRTF, to obtain a first target HRTF corresponding to the one third target HRTF, where the first value is a ratio of a first sum of squares to a second sum of squares, the first sum of squares is a sum of squares of all impulse responses included in a first HRTF corresponding to the one third target HRTF, and the second sum of squares is a sum of squares of all impulse responses included in the one third target HRTF.

It is assumed that the b second HRTFs are b second HRTFs to which b virtual speakers located on a second side of the target center correspond, the second side is a side that is of the target center and that is far away from the current right ear position, and the target center is the center of the three-dimensional space corresponding to the M virtual speakers.

In this case, the processor 21 is further configured to multiply a second modification factor and the high-band impulse responses included in the b second HRTFs, to obtain the b second target HRTFs, where the second modification factor is a value greater than 0 and less than 1.

The processor 21 is further configured to: multiply a second modification factor and the high-band impulse responses included in the b second HRTFs, to obtain the b fourth target HRTFs, where the second modification factor is a value greater than 0 and less than 1; and multiply a fourth modification factor and each impulse response included in the b fourth target HRTFs, to obtain the b second target HRTFs, where the fourth modification factor is a value greater than 1.

The processor 21 is further configured to: multiply a second modification factor and the high-band impulse responses included in the b second HRTFs, to obtain the b fourth target HRTFs, where the second modification factor is a value greater than 0 and less than 1; and for one fourth target HRTF, multiply a second value and all impulse responses included in the one fourth target HRTF, to obtain a second target HRTF corresponding to the one fourth target HRTF, where the second value is a ratio of a third sum of squares to a fourth sum of squares, the third sum of squares is a sum of squares of all impulse responses included in a second HRTF corresponding to the one fourth target HRTF, and the fourth sum of squares is a sum of squares of all impulse responses included in the one fourth target HRTF.

It is assumed that $a=a_1+a_2$, the $a_1$ first HRTFs are $a_1$ first HRTFs to which $a_1$ virtual speakers located on a first side of a target center correspond, the $a_2$ first HRTFs are $a_2$ first HRTFs to which $a_2$ virtual speakers located on a second side of the target center correspond, the first side is a side that is of the target center and that is far away from the current left ear position, the second side is a side that is of the target center and that is far away from the current right ear position, and the target center is a center of three-dimensional space corresponding to the M virtual speakers.

In this case, the processor 21 is further configured to: multiply a first modification factor and high-band impulse responses of the $a_1$ first HRTFs, to obtain $a_1$ third target HRTFs, and multiply a fifth modification factor and high-band impulse responses of the $a_2$ first HRTFs, to obtain $a_2$ fifth target HRTFs, where the a first target HRTFs include the $a_1$ third target HRTFs and the $a_2$ fifth target HRTFs.

A product of the first modification factor and the fifth modification factor is 1, and the first modification factor is a value greater than 0 and less than 1.

The processor 21 is further configured to: multiply a first modification factor and high-band impulse responses of the $a_1$ first HRTFs, to obtain $a_1$ third target HRTFs, and multiply a fifth modification factor and high-band impulse responses of the $a_2$ first HRTFs, to obtain $a_2$ fifth target HRTFs, where a product of the first modification factor and the fifth modification factor is 1, and the first modification factor is a value greater than 0 and less than 1; and multiply a third modification factor and each impulse response included in the $a_1$ third target HRTFs, to obtain $a_1$ sixth target HRTFs, and multiply a sixth modification factor and each impulse response included in the $a_2$ fifth target HRTFs, to obtain $a_2$ seventh target HRTFs. The a first target HRTFs include the $a_1$ sixth target HRTFs and the $a_2$ seventh target HRTFs, the third modification factor is a value greater than 1, and the sixth modification factor is a value greater than 0 and less than 1.

The processor 21 is further configured to: multiply a first modification factor and high-band impulse responses of the $a_1$ first HRTFs, to obtain $a_1$ third target HRTFs, and multiply a fifth modification factor and high-band impulse responses of the $a_2$ first HRTFs, to obtain $a_2$ fifth target HRTFs, where a product of the first modification factor and the fifth modification factor is 1, and the first modification factor is a value greater than 0 and less than 1; and for one third target HRTF, multiply a first value and all impulse responses included in the one third target HRTF, to obtain a sixth target HRTF corresponding to the one third target HRTF, where the first value is a ratio of a first sum of squares to a second sum of squares, the first sum of squares is a sum of squares of all impulse responses included in a first HRTF corresponding to the one third target HRTF, and the second sum of squares is a sum of squares of all impulse responses included in the one third target HRTF; and for one fifth target HRTF, multiply a third value and all impulse responses included in the one fifth target HRTF, to obtain a seventh target HRTF corresponding to the one fifth target HRTF, where the third value is a ratio of a fifth sum of squares to a sixth sum of squares, the fifth sum of squares is a sum of squares of all impulse responses included in a first HRTF corresponding to the one fifth target HRTF, and the sixth sum of squares is a sum of squares of all impulse responses included in the one fifth target HRTF; and the a first target HRTFs include the $a_1$ sixth target HRTFs and $a_2$ seventh target HRTFs.

It is assumed that $b=b_1+b_2$, the $b_1$ second HRTFs are $b_1$ second HRTFs to which $b_1$ virtual speakers located on the second side of the target center correspond, the $b_2$ second HRTFs are $b_2$ second HRTFs to which $b_2$ virtual speakers located on the first side of the target center correspond, the first side is a side that is of the target center and that is far away from the current left ear position, the second side is a side that is of the target center and that is far away from the current right ear position, and the target center is the center of the three-dimensional space corresponding to the M virtual speakers.

In this case, the processor 21 is further configured to: multiply a second modification factor and high-band impulse responses of the $b_1$ second HRTFs, to obtain $b_1$ fourth target HRTFs, and multiply a seventh modification factor and high-band impulse responses of the $b_2$ second HRTFs, to obtain $b_2$ eighth target HRTFs, where the b second target HRTFs include the $b_1$ fourth target HRTFs and the $b_2$ eighth target HRTFs.

A product of the second modification factor and the seventh modification factor is 1, and the second modification factor is a value greater than 0 and less than 1.

The processor 21 is further configured to: multiply a second modification factor and high-band impulse responses of the $b_1$ second HRTFs, to obtain $b_1$ fourth target HRTFs, and multiply a seventh modification factor and high-band impulse responses of the $b_2$ second HRTFs, to obtain $b_2$ eighth target HRTFs, where a product of the second modification factor and the seventh modification factor is 1, and the second modification factor is a value greater than 0 and less than 1; and multiply a fourth modification factor and each impulse response included in the $b_1$ fourth target HRTFs, to obtain $b_1$ ninth target HRTFs, and multiply an eighth modification factor and each impulse response included in the $b_2$ eighth target HRTFs, to obtain $b_2$ tenth target HRTFs, where the b second target HRTFs include the $b_1$ ninth target HRTFs and the $b_2$ tenth target HRTFs, the fourth modification factor is a value greater than 1, and the eighth modification factor is a value greater than 0 and less than 1.

The processor 21 is further configured to: multiply a second modification factor and high-band impulse responses of the $b_1$ second HRTFs, to obtain $b_1$ fourth target HRTFs, and multiply a seventh modification factor and high-band impulse responses of the $b_2$ second HRTFs, to obtain $b_2$ eighth target HRTFs, where a product of the second modification factor and the seventh modification factor is 1, and the second modification factor is a value greater than 0 and less than 1; and for one fourth target HRTF, multiply a second value and all impulse responses included in the one fourth target HRTF, to obtain a ninth target HRTF corresponding to the one fourth target HRTF, where the second value is a ratio of a third sum of squares to a fourth sum of squares, the third sum of squares is a sum of squares of all impulse responses included in a second HRTF corresponding to the one fourth target HRTF, and the fourth sum of squares is a sum of squares of all impulse responses included in the one fourth target HRTF; and for one eighth target HRTF, multiply a fourth value and all impulse responses included in the one eighth target HRTF, to obtain a tenth target HRTF corresponding to the one eighth target HRTF, where the fourth value is a ratio of a seventh sum of squares to an eighth sum of squares, the seventh sum of squares is a sum of squares of all impulse responses included in a second HRTF corresponding to the one eighth target HRTF, and the eighth sum of squares is a sum of squares of all impulse responses included in the one eighth target HRTF; and the b second target HRTFs include the $b_1$ ninth target HRTFs and $b_2$ tenth target HRTFs.

The processor 21 is further configured to: adjust an order of magnitude of energy of the first target audio signal to a first order of magnitude, where the first order of magnitude is an order of magnitude of energy of the third target audio signal, and the third target audio signal is obtained based on the M first HRTFs and the M first audio signals; and adjust an order of magnitude of energy of the second target audio signal to a second order of magnitude, where the second order of magnitude is an order of magnitude of energy of the fourth target audio signal, and the fourth target audio signal is obtained based on the M second HRTFs and the M first audio signals.

It may be understood that each method after the processor 21 obtains the to-be-processed signal may be performed by the rendering component in the processor.

The audio signal receiving apparatus in this embodiment modifies the high-band impulse responses of the a first HRTFs, so that interference caused by the obtained first target audio signal to the second target audio signal can be reduced. In addition, the audio signal receiving apparatus modifies the high-band impulse responses of the b second HRTFs, so that interference caused by the second target audio signal to the first target audio signal can be reduced. This reduces crosstalk between the first target audio signal corresponding to the left ear position and the second target audio signal corresponding to the right ear position.

The following uses specific embodiments to describe an audio processing method in this application. The following embodiments are all executed by an audio signal receive end, for example, the mobile terminal 140 shown in FIG. 2.

Figure 4:
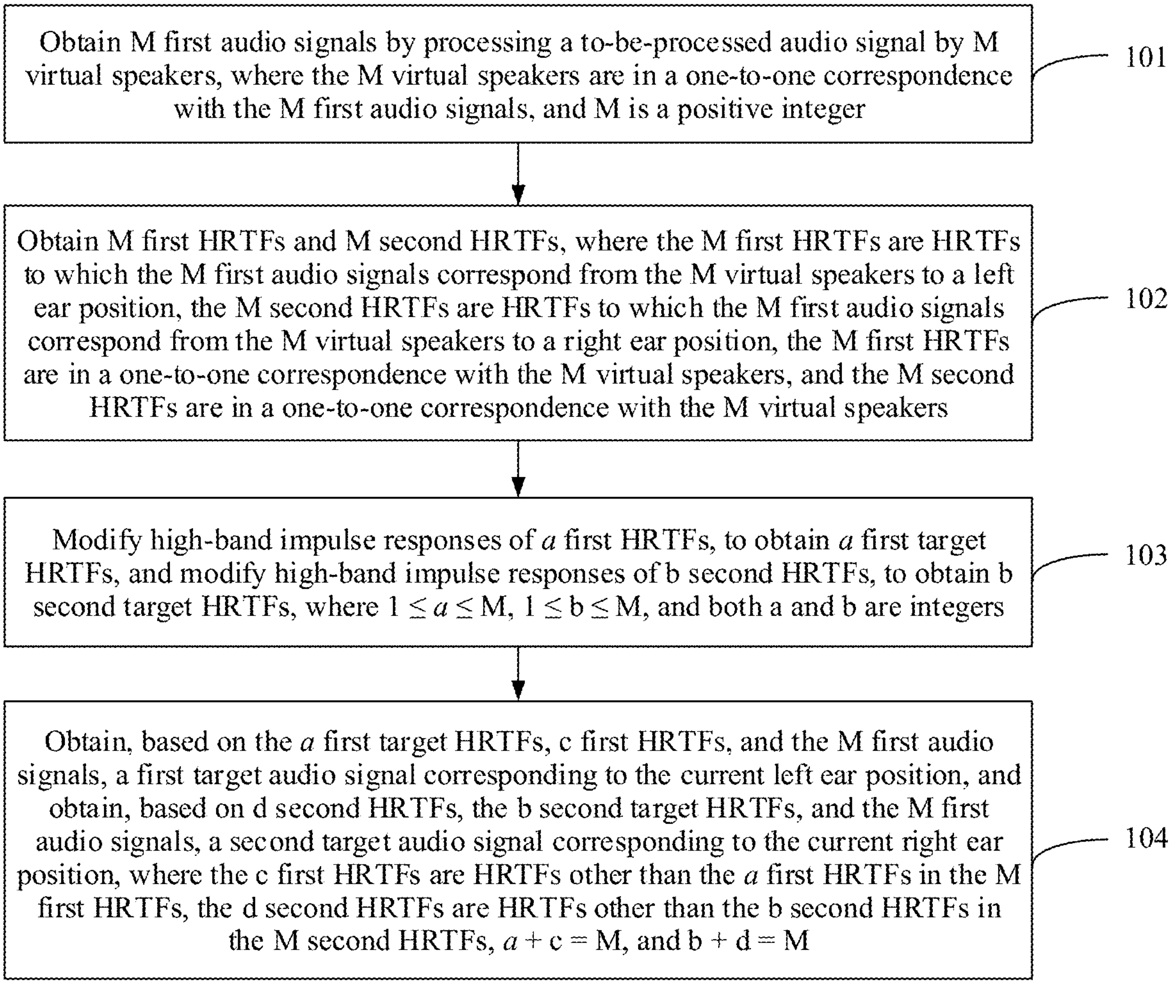
FIG. 4 is a flowchart of an audio processing method according to an embodiment of this application.

FIG. 4 is a flowchart of an audio processing method according to an embodiment of this application. Referring to FIG. 4, the method in this embodiment includes the following operations.

Operation S101: Obtain M first audio signals by processing a to-be-processed audio signal by M virtual speakers, where the M virtual speakers are in a one-to-one correspondence with the M first audio signals, and M is a positive integer.

Operation S102: Obtain M first HRTFs and M second HRTFs, where the M first HRTFs are HRTFs to which the M first audio signals correspond from the M virtual speakers to a left ear position, the M second HRTFs are HRTFs to which the M first audio signals correspond from the M virtual speakers to a right ear position, the M first HRTFs are in a one-to-one correspondence with the M virtual speakers, and the M second HRTFs are in a one-to-one correspondence with the M virtual speakers.

Operation S103: Modify high-band impulse responses of a first HRTFs, to obtain a first target HRTFs, and modify high-band impulse responses of b second HRTFs, to obtain b second target HRTFs, where $1 \leq a \leq M$, $1 \leq b \leq M$, and both a and b are integers.

Operation S104: Obtain, based on the a first target HRTFs, c first HRTFs, and the M first audio signals, a first target audio signal corresponding to the current left ear position, and obtain, based on d second HRTFs, the b second target HRTFs, and the M first audio signals, a second target audio signal corresponding to the current right ear position, where the c first HRTFs are HRTFs other than the a first HRTFs in the M first HRTFs, the d second HRTFs are HRTFs other than the b second HRTFs in the M second HRTFs, a+c=M, and b+d=M.

In an embodiment, the method in this embodiment of this application is a method performed by an audio signal receive end. An audio signal transmit end collects a stereo signal sent by a sound source, and an encoding component of the audio signal transmit end encodes the stereo signal sent by the sound source, to obtain an encoded signal. Then, the encoded signal is transmitted to the audio signal receive end through a wireless or wired network, and the audio signal receive end decodes the encoded signal. A signal obtained through decoding is the to-be-processed audio signal in this embodiment. In other words, the to-be-processed audio signal in this embodiment may be a signal obtained through decoding by a decoding component in a processor, or a signal obtained through decoding by the decoding and rendering component 120 or the decoding component in the mobile terminal 140 in FIG. 2.

It may be understood that, if a standard used for processing the audio signal is Ambisonic, the encoded signal obtained by the audio signal transmit end is a standard Ambisonic signal. Correspondingly, a signal obtained through decoding by the audio signal receive end is also an Ambisonic signal, for example, a B-format Ambisonic signal. The Ambisonic signal includes a first-order Ambisonic (FOA for short) signal and a high-order Ambisonic signal.

The current left ear position in this embodiment is a left ear position of a current listener, and the current right ear position in this embodiment is a right ear position of the current listener. In this embodiment, the first target audio signal is a left channel signal, and the second target audio signal is a right channel signal.

The following describes this embodiment by using an example in which the to-be-processed audio signal obtained by the audio signal receive end through decoding is the B-format Ambisonic signal.

In operation S101, the M first audio signals are obtained by processing the to-be-processed audio signal by the M virtual speakers, where M≥1 and M is an integer.

Optionally, M may be any one of 4, 8, 16, and the like.

The virtual speaker may process the to-be-processed audio signal into the first audio signal according to the following Formula 1:

$$P_{1m}=\frac{1}{L}\left(W\frac{1}{\sqrt{2}}+X(\cos(\phi_{1m})\cos(\theta_{1m}))+Y(\sin(\phi_{1m})\cos(\theta_{1m}))+Z(\sin(\phi_{1m}))\right)$$

Formula 1, where $1\le m\le M$; $P_{1m}$ represents an $m^{th}$ first audio signal obtained by processing the to-be-processed audio signal by an $m^{th}$ virtual speaker; W represents a component corresponding to all sounds included in an environment of the sound source, and is referred to as an environment component; X represents a component, on an X axis, of all the sounds included in the environment of the sound source, and is referred to as an X-coordinate component; Y represents a component, on a Y axis, of all the sounds included in the environment of the sound source, and is referred to as a Y-coordinate component; and Z represents a component, on a Z axis, of all the sounds included in the environment of the sound source, and is referred to as a Z-coordinate component. The X axis, the Y axis, and the Z axis herein are respectively an X axis, a Y axis, and a Z axis of a three-dimensional coordinate system corresponding to the sound source (namely, a three-dimensional coordinate system corresponding to the audio signal transmit end), and L represents an energy adjustment coefficient. $\phi_{1m}$ represents an elevation of the $m^{th}$ virtual speaker relative to a coordinate origin of the three-dimensional coordinate system corresponding to the audio signal receive end, and $\theta_{1m}$ represents an azimuth of the $m^{th}$ virtual speaker relative to the coordinate origin.

Before operation S102, correspondences between a plurality of preset positions and a plurality of HRTFs need to be obtained in advance, and the M first HRTFs and the M second HRTFs corresponding to the M virtual speakers are determined based on the correspondences.

The following describes a manner of obtaining the correspondences between the plurality of preset positions and the plurality of HRTFs. The manner of obtaining the correspondences between the plurality of preset positions and the plurality of HRTFs is not limited to the following manner.

Figure 5:
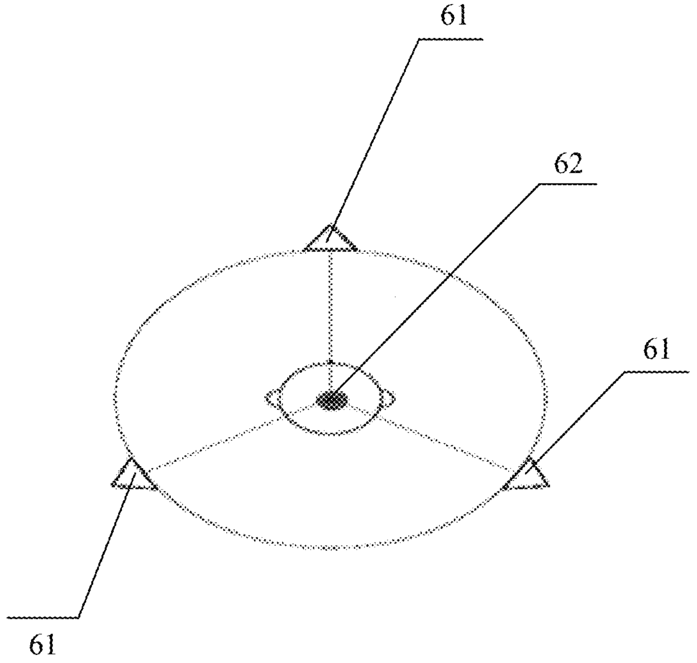
FIG. 5 is a diagram of a measurement scenario in which an HRTF is measured by using a head center as a center according to an embodiment of this application.

FIG. 5 is a diagram of a measurement scenario in which an HRTF is measured by using a head center as a center according to an embodiment of this application. FIG. 5 shows several positions 61 relative to a head center 62. It may be understood that there are a plurality of HRTFs centered at the head center, and audio signals that are sent by first sound sources at different positions 61 correspond to different HRTFs that are centered at the head center when the audio signals are transmitted to the head center. When the HRTF centered at the head center is measured, the head center may be a head center of a current listener, or may be a head center of another listener, or may be a head center of a virtual listener.

In this way, HRTFs corresponding to a plurality of preset positions can be obtained by setting first sound sources at different preset positions relative to the head center 62. To be specific, if a position of a first sound source 1 relative to the head center 62 is a position c, an HRTF 1 that is used to transmit, to the head center 62, a signal sent by the first sound source 1 and that is obtained through measurement is an HRTF 1 that is centered at the head center 62 and that corresponds to the position c; if a position of a first sound source 2 relative to the head center 62 is a position d, an HRTF 2 that is used to transmit, to the head center 62, a signal sent by the first sound source 2 and that is obtained through measurement is an HRTF 2 that is centered at the head center 62 and that corresponds to the position d; and so on. The position c includes an azimuth 1, an elevation 1, and a distance 1. The azimuth 1 is an azimuth of the first sound source 1 relative to the head center 62. The elevation 1 is an elevation of the first sound source 1 relative to the head center 62. The distance 1 is a distance between the first sound source 1 and the head center 62. Likewise, the position d includes an azimuth 2, an elevation 2, and a distance 2. The azimuth 2 is an azimuth of the first sound source 2 relative to the head center 62. The elevation 2 is an elevation of the first sound source 2 relative to the head center 62. The distance 2 is a distance between the first sound source 2 and the head center 62.

During setting positions of the first sound sources relative to the head center 62, when distances and elevations do not change, azimuths of adjacent first sound sources may be spaced by a first preset angle; when distances and azimuths do not change, elevations of adjacent first sound sources may be spaced by a second preset angle; and when elevations and azimuths do not change, distances between adjacent first sound sources may be spaced by a first preset distance. The first preset angle may be any one of 3° to 10°, for example, 5°. The second preset angle may be any one of 3° to 10°, for example, 5°. The first distance may be any one of 0.05 m to 0.2 m, for example, 0.1 m.

For example, a process of obtaining the HRTF 1 that is centered at the head center and that corresponds to the position c (100°, 50°, 1 m) is as follows: The first sound source 1 is placed at a position at which an azimuth relative to the head center is 100°, an elevation relative to the head center is 50°, and a distance from the head center is 1 m; and a corresponding HRTF that is used to transmit, to the head center 62, an audio signal sent by the first sound source 1 is measured, so as to obtain the HRTF 1 centered at the head center. The measurement method is an existing method, and details are not described herein.

For another example, a process of obtaining the HRTF 2 that is centered at the head center and that corresponds to the position d (100°, 45°, 1 m) is as follows: The first sound source 2 is placed at a position at which an azimuth relative to the head center is 100°, an elevation relative to the head center is 45°, and a distance from the head center is 1 m; and a corresponding HRTF that is used to transmit, to the head center 62, an audio signal sent by the first sound source 2 is measured, so as to obtain the HRTF 2 centered at the head center.

For another example, a process of obtaining the HRTF 3 that is centered at the head center and that corresponds to a position e (95°, 45°, 1 m) is as follows: A first sound source 3 is placed at a position at which an azimuth relative to the head center is 95°, an elevation relative to the head center is 45°, and a distance from the head center is 1 m; and a corresponding HRTF that is used to transmit, to the head center 62, an audio signal sent by the first sound source 3 is measured, so as to obtain the HRTF 3 centered at the head center.

For another example, a process of obtaining the HRTF 4 that is centered at the head center and that corresponds to a position f (95°, 50°, 1 m) is as follows: A first sound source 4 is placed at a position at which an azimuth relative to the head center is 95°, an elevation relative to the head center is 50°, and a distance from the head center is 1 m; and a corresponding HRTF that is used to transmit, to the head center 62, an audio signal sent by the first sound source 4 is measured, so as to obtain the HRTF 4 centered at the head center.

For another example, a process of obtaining the HRTF 5 that is centered at the head center and that corresponds to a position g (100°, 50°, 1.1 m) is as follows: A first sound source 5 is placed at a position at which an azimuth relative to the head center is 100°, an elevation relative to the head center is 50°, and a distance from the head center is 1.1 m; and a corresponding HRTF that is used to transmit, to the head center 62, an audio signal sent by the first sound source 5 is measured, so as to obtain the HRTF 5 centered at the head center.

It should be noted that in a subsequent position (x, x, x), the first x represents an azimuth, the second x represents an elevation, and the third x represents a distance.

According to the foregoing method, the correspondences between a plurality of positions and a plurality of HRTFs centered at the head center may be obtained through measurement. It may be understood that, during measurement of the HRTF centered at the head center, the plurality of positions at which the first sound sources are placed may be referred to as preset positions. Therefore, according to the foregoing method, the correspondences between the plurality of preset positions and the plurality of HRTFs centered at the head center may be obtained through measurement. In this embodiment, the correspondences are referred to as first correspondences, and the preset positions are positions relative to the head center.

Further, a method similar to the foregoing method may be used to measure an HRTF centered at a left ear position, to obtain correspondences between a plurality of preset positions and a plurality of HRTFs centered at the left ear position. In this embodiment, the correspondences are referred to as second correspondences, and the preset positions are positions relative to the left ear position. During measurement of the HRTF centered at the left ear position, the left ear position may be a current left ear position of a current listener, or may be a head center of another listener, or may be a left ear position of a virtual listener.

Further, a method similar to the foregoing method may be used to measure an HRTF centered at a right ear position, to obtain correspondences between a plurality of preset positions and a plurality of HRTFs centered at the right ear position. In this embodiment, the correspondences are referred to as third correspondences, and the preset positions are positions relative to the right ear position. During measurement of the HRTF centered at the right ear position, the right ear position may be a current right ear position of a current listener, or may be a head center of another listener, or may be a right ear position of a virtual listener.

It may be understood that M first HRTFs and M second HRTFs may be obtained based on any correspondences of the foregoing correspondences. The memory in FIG. 3 may store at least one of: the first correspondences, the second correspondences, and the third correspondences.

The obtaining M first HRTFs includes: obtaining M first positions of M virtual speakers relative to the current left ear position; and determining, based on the M first positions and the correspondences, that M HRTFs corresponding to the M first positions are the M first HRTFs. The correspondences are prestored correspondences between a plurality of preset positions and a plurality of HRTFs, and the correspondences are either of: the first correspondences and the second correspondences.

In an embodiment, the following describes a process of obtaining the M first HRTFs by using an example in which the correspondences are the first correspondences.

A first position of each virtual speaker relative to the current left ear position is obtained, and if there are M virtual speakers, the M first positions are obtained. Each first position includes a first azimuth and a first elevation of the corresponding virtual speaker relative to the current left ear position, and a first distance between the current left ear position and the virtual speaker.

The determining, based on the M first positions and the first correspondences, that M HRTFs corresponding to the M first positions are the M first HRTFs includes: determining M first preset positions associated with the M first positions. The M first preset positions are preset positions included in the first correspondences. That M HRTFs corresponding to the M first preset positions are the M first HRTFs is determined based on the first correspondences.

In an embodiment, the first preset position associated with the first position may be the first position; or an elevation included in the first preset position is a target elevation that is closest to the first elevation included in the first position, an azimuth included in the first preset position is a target azimuth that is closest to the first azimuth included in the first position, and a distance included in the first preset position is a target distance that is closest to the first distance included in the first position. The target azimuth is an azimuth included in a corresponding preset position during measurement of the HRTF centered at the head center, namely, an azimuth of the placed first sound source relative to the head center during measurement of the HRTF centered at the head center. The target elevation is an elevation in a corresponding preset position during measurement of the HRTF centered at the head center, namely, an elevation of the first placed sound source relative to the head center during measurement of the HRTF centered at the head center. The target distance is a distance in a corresponding preset position during measurement of the HRTF centered at the head center, namely, a distance between the placed first sound source and the head center during measurement of the HRTF centered at the head center. In other words, all the first preset positions are positions at which the first sound sources are placed during measurement of the plurality of HRTFs centered at the head center. In other words, an HRTF that is centered at the head center and that corresponds to each first preset position is measured in advance.

It may be understood that, if the first azimuth included in the first position is between two target azimuths, one of the two target azimuths may be determined, according to a preset rule, as the azimuth included in the first preset position. For example, the preset rule is as follows: If the first azimuth included in the first position is between the two target azimuths, a target azimuth in the two target azimuths that is closer to the first azimuth is determined as the azimuth included in the first preset position. If the first elevation included in the first position is between two target elevations, one of the two target elevations may be determined, according to a preset rule, as the elevation included in the first preset position. For example, the preset rule is as follows: If the first elevation included in the first position is between the two target elevations, a target elevation in the two target elevations that is closer to the first elevation is determined as the elevation included in the first preset position. If the first distance included in the first position is between two target distances, one of the two target distances may be determined, according to a preset rule, as the distance included in the first preset position. For example, the preset rule is as follows: If the first distance included in the first position is between the two target distances, a target distance in the two target distances that is closer to the first distance is determined as the distance included in the first preset position.

For example, if in the first position, obtained through measurement in operation S102, of the $m^{th}$ virtual speaker relative to the current left ear position, a first azimuth is 88°, a first elevation is 46°, and a first distance is 1.02 m, the first correspondences include an HRTF corresponding to the position (90°, 45°, 1 m), an HRTF corresponding to a position (85°, 45°, 1 m), an HRTF corresponding to a position (90°, 50°, 1 m), an HRTF corresponding to a position (85°, 50°, 1 m), an HRTF corresponding to a position (90°, 45°, 1.1 m), an HRTF corresponding to a position (85°, 45°, 1.1 m), an HRTF corresponding to a position (90°, 50°, 1.1 m), and an HRTF corresponding to a position (85°, 50°, 1.1 m). 88° is between 85° and 90° but is closer to 90°, 46° is between 45° and 50° but is closer to 45°, and 1.02 m is between 1 m and 1.1 m but is closer to 1 m. Therefore, it is determined that the position (90°, 45°, 1 m) is a first preset position m associated with the first position of the $m^{th}$ virtual speaker relative to the current left ear position. In this case, the HRTF, included in the first correspondences, corresponding to the position ((90°, 45°, 1 m) is a first HRTF corresponding to the $m^{th}$ virtual speaker, that is, one of the M first HRTFs.

In other words, after the M first preset positions associated with the M first positions are determined, in the first correspondences, the M HRTFs corresponding to the M first preset positions are the M first HRTFs.

Then, the obtaining M second HRTFs includes: obtaining M second positions of M virtual speakers relative to the current right ear position, and determining, based on the M second positions and the correspondences, that M HRTFs corresponding to the M second positions are the M second HRTFs. The correspondences are prestored correspondences between a plurality of preset positions and a plurality of HRTFs, and the correspondences may be either of: the first correspondences and the third correspondences.

The following describes a process of obtaining the M second HRTFs by using an example in which the correspondences are the first correspondences.

A second position of each virtual speaker relative to the current right ear position is obtained, and if there are M virtual speakers, the M second positions are obtained. Each second position includes a second azimuth and a second elevation of the corresponding virtual speaker relative to the current right ear position, and a second distance between the current right ear position and the virtual speaker.

The determining, based on the M second positions and the first correspondences, that M HRTFs corresponding to the M second positions are the M second HRTFs includes: determining M second preset positions associated with the M second positions. The M second preset positions are preset positions included in the first correspondences. That M HRTFs corresponding to the M second preset positions are the M second HRTFs is determined based on the first correspondences.

In an embodiment, for the second preset position associated with the second position, refer to the descriptions of the first preset position associated with the first position. Details are not described herein again. After the M second preset positions associated with the M second positions are determined, in the first correspondences, the M HRTFs corresponding to the M second preset positions are the M second HRTFs.

In operation S103, the high-band impulse responses of the a first HRTFs are modified, to obtain the a first target HRTFs, and the high-band impulse responses of the b second HRTFs are modified, to obtain the b second target HRTFs, where $1 \le a \le M$, and $1 \le b \le M$.

In an embodiment, that the high-band impulse responses of the a first HRTFs are modified, and $1 \le a \le M$ means that a high-band impulse response of at least one first HRTF is modified. In other words, a high-band impulse response of one first HRTF may be modified, or high-band impulse responses of the M first HRTFs may be modified.

Likewise, that the high-band impulse responses of the b second HRTFs are modified, and $1 \le b \le M$ means that a high-band impulse response of at least one second HRTF is modified. In other words, a high-band impulse response of one second HRTF may be modified, or high-band impulse responses of the M second HRTFs may be modified.

It may be understood that a and b may be the same or may be different.

For the to-be-modified a first HRTFs, in a manner, the a first HRTFs are a first HRTFs to which a virtual speakers located on a first side of a target center correspond, the first side is a side that is of the target center and that is far away from the current left ear position, and the target center is a center of three-dimensional space corresponding to the M virtual speakers.

In an embodiment, the a first HRTFs are a first HRTFs to which a virtual speakers located on a second side of the target center correspond, and the second side is a side that is of the target center and that is far away from the current right ear position.

In an embodiment, $a=a_1+a_2$, that is, the a first HRTFs include $a_1$ first HRTFs and $a_2$ first HRTFs. The $a_1$ first HRTFs are $a_1$ first HRTFs to which the $a_1$ virtual speakers located on the first side of the target center correspond, and the $a_2$ first HRTFs are $a_2$ first HRTFs to which the $a_2$ virtual speakers located on the second side of the target center correspond.

For the to-be-modified b second HRTFs, in a manner, the b second HRTFs are b second HRTFs to which b virtual speakers on the second side of the target center correspond.

In an embodiment, the b second HRTFs are b second HRTFs to which b virtual speakers on the first side of the target center correspond.

In an embodiment, $b=b_1+b_2$, the $b_1$ second HRTFs are $b_1$ second HRTFs to which the $b_1$ virtual speakers located on the second side of the target center correspond, and the $b_2$ second HRTFs are $b_2$ second HRTFs to which the $b_2$ virtual speakers located on the first side of the target center correspond.

The following describes, with reference to specific examples, the to-be-modified a first HRTFs and the to-be-modified b second HRTFs.

The three-dimensional space corresponding to the M virtual speakers may be a regular polyhedron. If the space is a cube, one virtual speaker may be placed at each of eight corners of the cube. In this case, M=8. Correspondingly, a center of the cube is the target center.

Figure 6:
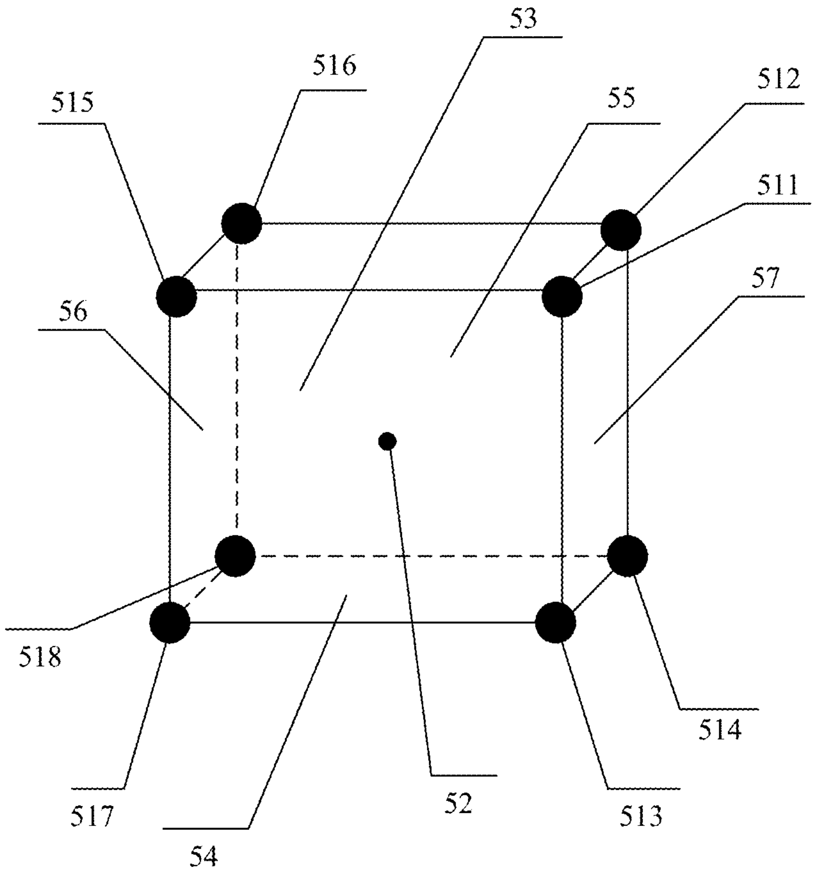
FIG. 6 is a schematic diagram of distribution of M virtual speakers according to an embodiment of this application.

FIG. 6 is a schematic diagram of distribution of M virtual speakers according to an embodiment of this application. Referring to FIGS. 6, 511 to 518 in the figure represent virtual speakers, and there are eight virtual speakers in total. 53 represents three-dimensional space corresponding to the eight virtual speakers, and 52 represents a target center of the three-dimensional space corresponding to the eight virtual speakers. A first side of the target center is a side that is of the target center and that is far away from a current left ear position, and a second side of the target center is a side that is of the target center and that is far away from a current right ear position.

Referring to FIG. 6, in the manner in which "a first HRTFs are a first HRTFs to which a virtual speakers located on a first side of a target center correspond, and b second HRTFs are b second HRTFs to which b virtual speakers on a second side of the target center correspond":

If a current listener generally faces a first surface (the front surface in FIG. 5) 54 of the cube space, the a first HRTFs correspond to a virtual speakers in the virtual speakers 511 to 514, and the b second HRTFs correspond to b virtual speakers in the virtual speakers 515 to 518; If the listener generally faces a second side (the rear surface in FIG. 5) 55 of the cube space, the a first HRTFs correspond to a virtual speakers in the virtual speakers 515 to 518, and the b second HRTFs correspond to b virtual speakers in the virtual speakers 511 to 514. If the listener generally faces a third side 56 of the cube space, the a first HRTFs correspond to a virtual speakers in the virtual speakers 512, 514, 516, and 518, and the b second HRTFs correspond to b virtual speakers in the virtual speakers 511, 513, 515, and 517. If the listener generally faces a fourth side 57 of the cube space, the a first HRTFs correspond to a virtual speakers in the virtual speakers 511, 513, 515, and 517, and the b second HRTFs correspond to b virtual speakers in the virtual speakers 512, 514, 516, and 518.

Optionally, in this embodiment, frequencies included in a high band each are greater than a preset frequency, and the preset frequency may be 10 K.

In operation S104, specifically, both the first target audio signal corresponding to the left ear position and the second target audio signal corresponding to the right ear position are rendered audio signals.

Crosstalk between the first target audio signal and the second target audio signal is mainly caused by high bands of the first target audio signal and the second target audio signal. Therefore, modification of the high-band impulse responses of the a first HRTFs in operation S103 can reduce interference caused by the obtained first target audio signal to the second target audio signal. Likewise, modification of high-band impulse responses of the b second HRTFs in operation S103 can reduce interference caused by the second target audio signal to the first target audio signal. In this way, crosstalk between the first target audio signal corresponding to the left ear position and the second target audio signal corresponding to the right ear position is reduced.

In an embodiment, that a first target audio signal corresponding to the left ear position is obtained based on a first target HRTFs, c first HRTFs, and M first audio signals includes: convolving each of the M first audio signals with a corresponding HRTF in all HRTFs of the a first target HRTFs and the c first HRTFs, to obtain M first convolved audio signals; and obtaining the first target audio signal based on the M first convolved audio signals.

To be specific, an $m^{th}$ first audio signal output by an $m^{th}$ virtual speaker is convolved with a first HRTF or a first target HRTF that corresponds to the $m^{th}$ virtual speaker, to obtain an $m^{th}$ first convolved audio signal. When there are M virtual speakers, M first convolved audio signals are obtained. A signal obtained by superimposing the M first convolved audio signals is the first target audio signal.

It may be understood that, if the first HRTF corresponding to the $m^{th}$ virtual speaker is modified to become the first target HRTF, the $m^{th}$ first audio signal output by the $m^{th}$ virtual speaker is convolved with the first target HRTF, to obtain the $m^{th}$ first convolved audio signal. If the first HRTF corresponding to the $m^{th}$ virtual speaker is not modified, the $m^{th}$ first audio signal output by the $m^{th}$ virtual speaker is convolved with the first HRTF, to obtain the $m^{th}$ first convolved audio signal.

It may be understood that, if all the M first HRTFs are modified, c=0.

In an embodiment, that a second target audio signal corresponding to the right ear position are obtained based on d second HRTFs, b second target HRTFs, and the M first audio signals includes: convolving each of the M first audio signals with a corresponding HRTF in all HRTFs of the d second HRTFs and the b second target HRTFs, to obtain M second convolved audio signals; and obtaining the second target audio signal based on the M second convolved audio signals.

To be specific, the $m^{th}$ first audio signal output by the $m^{th}$ virtual speaker is convolved with a second target HRTF or a second HRTF that corresponds to the $m^{th}$ virtual speaker, to obtain an $m^{th}$ second convolved audio signal. When there are M virtual speakers, M second convolved audio signals are obtained. A signal obtained by superimposing the M second convolved audio signals is the second target audio signal.

It may be understood that, if the second HRTF corresponding to the $m^{th}$ virtual speaker is modified to become the second target HRTF, the $m^{th}$ first audio signal output by the $m^{th}$ virtual speaker is convolved with the second target HRTF, to obtain the $m^{th}$ second convolved audio signal. If the second HRTF corresponding to the $m^{th}$ virtual speaker is not modified, the $m^{th}$ first audio signal output by the $m^{th}$ virtual speaker is convolved with the second HRTF, to obtain the $m^{th}$ second convolved audio signal.

It may be understood that, if all the M second HRTFs are modified, d=0.

In this embodiment, the high-band impulse responses of the a first HRTFs and the high-band impulse responses of the b second HRTFs are modified, so that crosstalk between the first target audio signal and the second target audio signal is reduced.

The following describes in detail operation S103 in the embodiment shown in FIG. 4 by using a specific embodiment.

First, a method for modifying, when the a first HRTFs are a first HRTFs to which the a virtual speakers located on the first side of the target center correspond, the high-band impulse responses of the a first HRTFs to obtain the a first target HRTFs is described.

Figure 7:
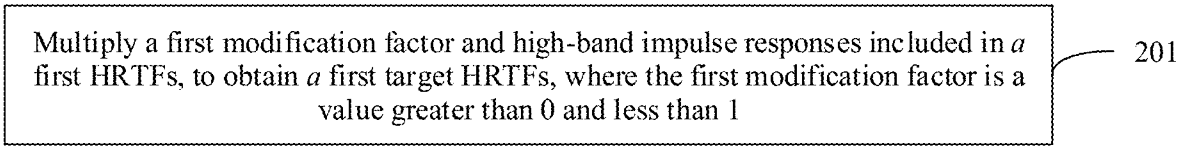
FIG. 7 is a flowchart of an audio processing method according to an embodiment of this application.

FIG. 7 is a flowchart of an audio processing method according to an embodiment of this application. Referring to FIG. 7, the method in this embodiment includes the following operation.

Operation S201: Multiply a first modification factor and high-band impulse responses included in a first HRTFs, to obtain a first target HRTFs, where the first modification factor is a value greater than 0 and less than 1.

Specifically, in operation S201, for each first HRTF in the a first HRTFs, the first modification factor and an impulse response that corresponds to each frequency greater than a preset frequency and that is included in the first HRTF are multiplied, to obtain a modified first HRTF, namely, a first target HRTF corresponding to the first HRTF. In this way, the a first target HRTFs are obtained.

The first modification factor may be 0.94, 0.95, 0.96, 0.97, or 0.98, or may be another value. A value of the first modification factor is related to a distance between a virtual speaker and a listener. A smaller distance between the virtual speaker and the listener indicates that the first modification factor is closer to 1.

In an embodiment, a high-band impulse response of a first HRTF corresponding to a virtual speaker that is far away from a current left ear position is modified by using the first modification factor, where the first modification factor is less than 1. It is equivalent that, impact on a second target audio signal caused by a high-band signal in a first audio signal output by the virtual speaker that is far away from the current left ear position (in other words, that is close to a current right ear position) is reduced. This can reduce crosstalk between a first target audio signal and the second target audio signal.

Figure 8:
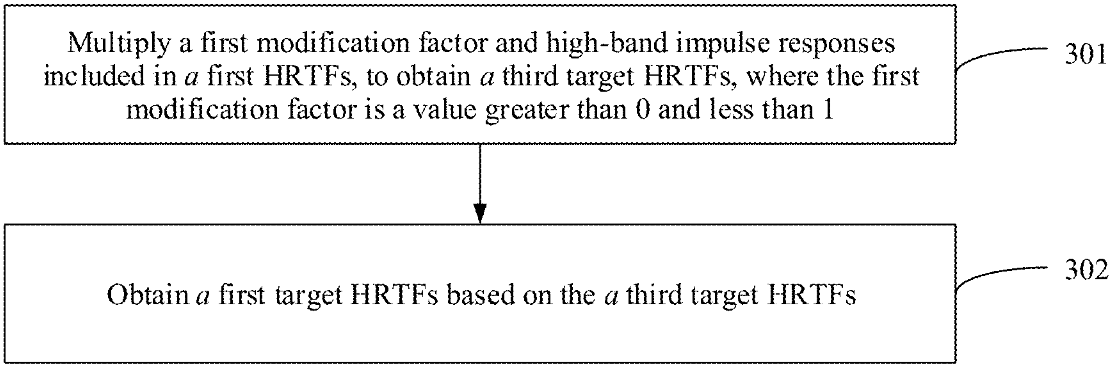
FIG. 8 is a flowchart of an audio processing method according to an embodiment of this application.

To maximally ensure that an order of magnitude of energy of the first target audio signal is the same as an order of magnitude of energy of a third target audio signal obtained based on M first HRTFs and M first audio signals, this embodiment is further improved on the basis of the foregoing embodiment. FIG. 8 is a flowchart 3 of an audio processing method according to an embodiment of this application. Referring to FIG. 8, the method in this embodiment includes the following operations.

Operation S301: Multiply a first modification factor and high-band impulse responses included in a first HRTFs, to obtain a third target HRTFs, where the first modification factor is a value greater than 0 and less than 1.

Operation S302: Obtain a first target HRTFs based on the a third target HRTFs.

Specifically, for operation S301, refer to the descriptions in operation S201 in the foregoing embodiment.

The obtaining a first target HRTFs based on the a third target HRTFs in operation S302 may include the following several feasible implementations.

In a first implementation, a third modification factor and each impulse response included in the a third target HRTFs are multiplied to obtain the a first target HRTFs.

In an embodiment, for each third target HRTF in the a third target HRTFs, the third modification factor and each impulse response included in the third target HRTF are multiplied to obtain a first target HRTF corresponding to the third target HRTF. In this way, the a first target HRTFs are obtained.

The HRTF may include an impulse response in frequency domain, and may further include an impulse response in time domain, and the impulse response in frequency domain and the impulse response in time domain may be interchanged. Therefore, in this embodiment, multiplying the third modification factor and impulse responses included in the third target HRTF may be multiplying the third modification factor and an impulse response in each time domain that is included in the third target HRTF, and multiplying the third modification factor and an impulse response in each frequency domain that is included in the third target HRTF. This is also applicable to subsequent embodiments.

In an embodiment, the third modification factor may be a preset value greater than 1, for example, 1.2.

A purpose of multiplying the third modification factor and each impulse response included in the a third target HRTFs, to obtain the a first target HRTFs is to maximally ensure that the order of magnitude of energy of the first target audio signal obtained based on the a first target HRTFs, c first HRTFs and the M first audio signals is the same as the order of magnitude of energy of the third target audio signal obtained based on the M first HRTFs and the M first audio signals.

In a second implementation, for one third target HRTF, a first value and all impulse responses included in the one third target HRTF are multiplied to obtain a first target HRTF corresponding to the one third target HRTF, where the first value is a ratio of a first sum of squares to a second sum of squares, the first sum of squares is a sum of squares of all impulse responses included in a first HRTF corresponding to the one third target HRTF, and the second sum of squares is a sum of squares of all impulse responses included in the one third target HRTF.

In an embodiment, for one third target HRTF, a sum of squares of all impulse responses included in the one third target HRTF is obtained, that is, a second sum of squares $Q_2$ is obtained, and a sum of squares of all impulse responses included in a first HRTF corresponding to the one third target HRTF is obtained, that is, a first sum of squares $Q_1$ is obtained. Then, a first value is obtained by using $Q_1/Q_2$. Each impulse response included in the one third target HRTF is multiplied by the first value to obtain a first target HRTF corresponding to the one third target HRTF. In this way, the a first target HRTFs are obtained.

The first HRTF corresponding to the third target HRTF refers to a third target HRTF obtained after the first HRTF is modified. For example, it is assumed that a first HRTF corresponding to an $m^{th}$ virtual speaker is a first HRTF 1, and after a high-band impulse response of the first HRTF 1 is modified, a third target HRTF 1 is obtained. In this case, the first HRTF 1 is a first HRTF corresponding to the third target HRTF 1.

For each third target HRTF, the first value and all impulse responses included in the third target HRTF are multiplied, to obtain a first target HRTF corresponding to the third target HRTF. This can ensure that the order of magnitude of energy of the first target audio signal is the same as the order of magnitude of energy of the third target audio signal.

According to the method in this embodiment, on the basis that crosstalk between the first target audio signal and the second target audio signal can be reduced, it can be maximally ensured that the order of magnitude of energy of the first target audio signal is the same as the order of magnitude of energy of the third target audio signal.

For a method for modifying, when the a first HRTFs are a first HRTFs to which a virtual speakers located on the first side of the target center correspond, the high-band impulse responses of the a first HRTFs to obtain the a first target HRTFs, refer to the embodiments shown in FIG. 7 and FIG. 8.

Further, a possible method for modifying, when b second HRTFs are b second HRTFs to which b virtual speakers located on the second side of the target center correspond, high-band impulse responses of the b second HRTFs to obtain b second target HRTFs is described in detail.

Figure 9:
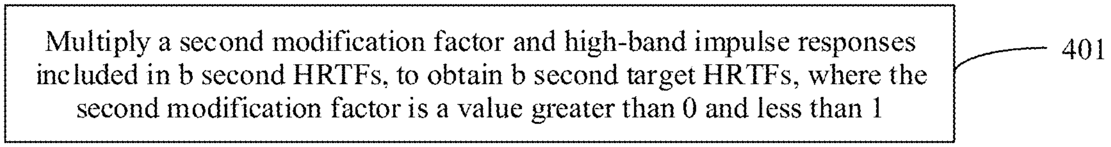
FIG. 9 is a flowchart of an audio processing method according to an embodiment of this application.

FIG. 9 is a flowchart of an audio processing method according to an embodiment of this application. Referring to FIG. 9, the method in this embodiment includes the following operation.

Operation S401: Multiply a second modification factor and high-band impulse responses included in b second HRTFs, to obtain b second target HRTFs, where the second modification factor is a value greater than 0 and less than 1.

Specifically, in operation S401, for each second HRTF in the b second HRTFs, the second modification factor and an impulse response that corresponds to each frequency greater than a preset frequency and that is included in the second HRTF are multiplied, to obtain a modified second HRTF, namely, a second target HRTF corresponding to the second HRTF.

The second modification factor may be 0.94, 0.95, 0.96, 0.97, or 0.98, or may be another value. A value of the second modification factor is related to a distance between a virtual speaker and a listener. For example, a smaller distance between the virtual speaker and the listener indicates that the second modification factor is closer to 1.

In an embodiment, the first modification factor is the same as the second modification factor.

In an embodiment, the first modification factor is different from the second modification factor.

It may be understood that meanings of high bands of the b second HRTFs are the same as meanings of high bands of a first HRTFs.

In an embodiment, a high-band impulse response of a second HRTF corresponding to a virtual speaker that is far away from the right ear is modified by using the second modification factor, where the second modification factor is less than 1. It is equivalent that, impact on a first target audio signal caused by a high-band signal in a first audio signal output by the virtual speaker that is far away from a current right ear position (in other words, that is close to a current left ear position) is reduced. This can reduce crosstalk between the first target audio signal and a second target audio signal.

Figure 10:
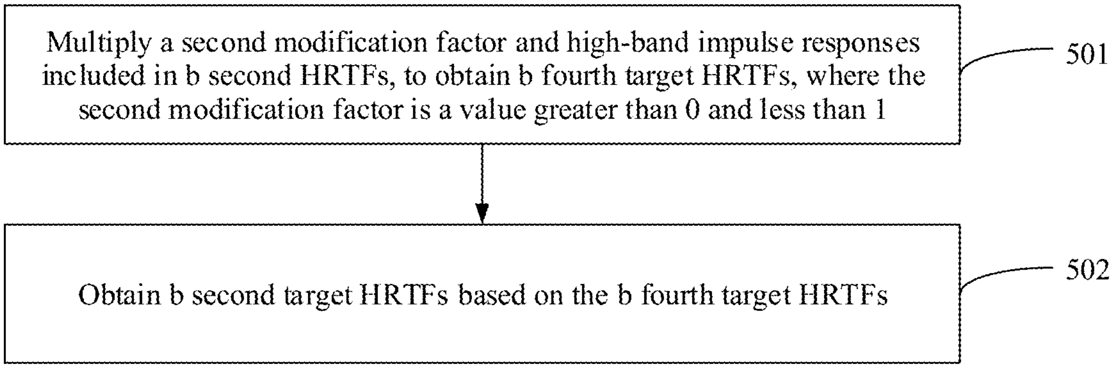
FIG. 10 is a flowchart of an audio processing method according to an embodiment of this application.

To maximally ensure that an order of magnitude of energy of the second target audio signal is the same as an order of magnitude of energy of a fourth target audio signal obtained based on M second HRTFs and M first audio signals, this embodiment is improved on the basis of the foregoing embodiment. FIG. 10 is a flowchart of an audio processing method according to an embodiment of this application. Referring to FIG. 10, the method in this embodiment includes the following operations.

Operation S501: Multiply a second modification factor and high-band impulse responses included in b second HRTFs, to obtain b fourth target HRTFs, where the second modification factor is a value greater than 0 and less than 1.

Operation S502: Obtain b second target HRTFs based on the b fourth target HRTFs.

Specifically, for operation S501, refer to operation S401 in the foregoing embodiment.

The obtaining b second target HRTFs based on the b fourth target HRTFs in operation S502 may include the following several feasible implementations.

In an embodiment, a fourth modification factor and each impulse response included in the b fourth target HRTFs are multiplied to obtain the b second target HRTFs.

For each fourth target HRTF in the b fourth target HRTFs, the fourth modification factor and each impulse response included in the fourth target HRTF are multiplied to obtain a second target HRTF corresponding to the fourth target HRTF. In this way, the b second target HRTFs are obtained.

In an embodiment, the fourth modification factor may be a preset value greater than 1. The third modification factor and the fourth modification factor may be the same or may be different.

A purpose of multiplying the fourth modification factor and each impulse response included in the b fourth target HRTFs, to obtain the b second target HRTFs is to maximally ensure that the order of magnitude of energy of the second target audio signal obtained based on the b second target HRTFs, d second HRTFs, and the M first audio signals is the same as the order of magnitude of energy of the fourth target audio signal obtained based on the M second HRTFs and the M first audio signals.

In an embodiment, for one fourth target HRTF, a second value and all impulse responses included in the one fourth target HRTF are multiplied to obtain a second target HRTF corresponding to the one fourth target HRTF, where the second value is a ratio of a third sum of squares to a fourth sum of squares, the third sum of squares is a sum of squares of all impulse responses included in a second HRTF corresponding to the one fourth target HRTF, and the fourth sum of squares is a sum of squares of all impulse responses included in the one fourth target HRTF.

In an embodiment, for one fourth target HRTF, a sum of squares of all impulse responses included in the one fourth target HRTF is obtained, that is, a fourth sum of squares $Q_4$ is obtained, and a sum of squares of all impulse responses included in a second HRTF corresponding to the one fourth target HRTF is obtained, that is, a third sum of squares $Q_3$ is obtained. Then, a second value is obtained by using $Q_3/Q_4$. Each impulse response included in the fourth target HRTF is multiplied by the second value to obtain a second target HRTF corresponding to the one fourth target HRTF. In this way, the b second target HRTFs are obtained.

The second HRTF corresponding to the fourth target HRTF refers to a fourth target HRTF obtained after the second HRTF is modified. For example, it is assumed that a second HRTF corresponding to an $m^{th}$ virtual speaker is a second HRTF 1, and after a high-band impulse response of the second HRTF 1 is modified, a fourth target HRTF 1 is obtained. In this case, the second HRTF 1 is a second HRTF corresponding to the fourth target HRTF 1.

For each fourth target HRTF, the second value and all impulse responses included in the fourth target HRTF are multiplied to obtain a second target HRTF corresponding to the fourth target HRTF. This can ensure that the order of magnitude of energy of the second target audio signal is the same as the order of magnitude of energy of the fourth target audio signal.

According to the method in an embodiment, on the basis that crosstalk between the first target audio signal and the second target audio signal can be reduced, it can be maximally ensured that the order of magnitude of energy of the second target audio signal is the same as the order of magnitude of energy of the fourth target audio signal.

For a method for modifying, when the b second HRTFs are b second HRTFs to which b virtual speakers located on the first side of the target center correspond, the high-band impulse responses of the b second HRTFs, refer to the embodiments shown in FIG. 9 and FIG. 10. A difference of this embodiment from the embodiments shown in FIG. 9 and FIG. 10 lies in that a multiplied modification factor may be less than 1 during modification of the high-band impulse responses of the b second HRTFs.

Further, a method for modifying, in a scenario in which "$a=a_1+a_2$, that is, a first HRTFs include $a_1$ first HRTFs and $a_2$ first HRTFs, where the $a_1$ first HRTFs are $a_1$ first HRTFs to which $a_1$ virtual speakers located on the first side of the target center correspond, and the $a_2$ first HRTFs are $a_2$ first HRTFs to which $a_2$ virtual speakers on the second side of the target center correspond", high-band impulse responses of the a first HRTFs to obtain a first target HRTFs is described.

Figure 11:
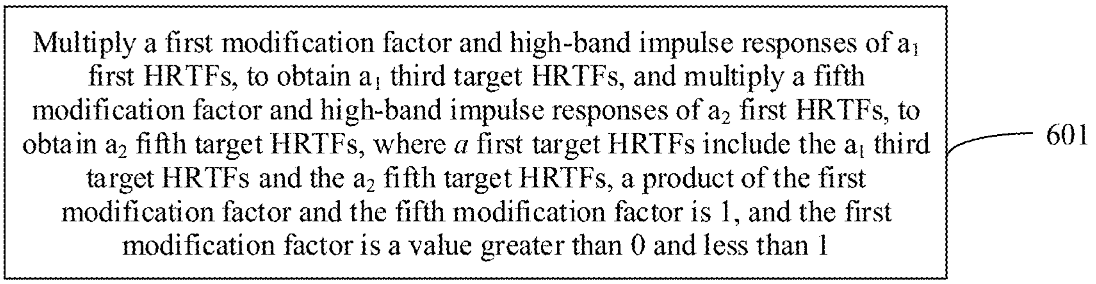
FIG. 11 is a flowchart of an audio processing method according to an embodiment of this application.

FIG. 11 is a flowchart of an audio processing method according to an embodiment of this application. Referring to FIG. 11, the method in this embodiment includes the following operation.

Operation S601: Multiply a first modification factor and high-band impulse responses of $a_1$ first HRTFs, to obtain $a_1$ third target HRTFs, and multiply a fifth modification factor and high-band impulse responses of $a_2$ first HRTFs, to obtain $a_2$ fifth target HRTFs, where a first target HRTFs include the $a_1$ third target HRTFs and the $a_2$ fifth target HRTFs, a product of the first modification factor and the fifth modification factor is 1, and the first modification factor is a value greater than 0 and less than 1.

In an embodiment, in operation S601, for each first HRTF in the $a_1$ first HRTFs, the first modification factor and an impulse response that corresponds to each frequency greater than a preset frequency and that is included in the first HRTF are multiplied, to obtain a modified first HRTF, namely, a third target HRTF corresponding to the first HRTF. In this way, the $a_1$ third target HRTFs are obtained.

For each first HRTF in the $a_2$ first HRTFs, the fifth modification factor and an impulse response that corresponds to each frequency greater than a preset frequency and that is included in the first HRTF are multiplied, to obtain a modified first HRTF, namely, a fifth target HRTF corresponding to the first HRTF. In this way, the $a_2$ fifth target HRTFs are obtained.

A meaning of the first modification factor is the same as that in the embodiment shown in FIG. 7, and details are not described herein again. A product of the fifth modification factor and the first modification factor is 1. In other words, the fifth modification factor is inversely proportional to the first modification factor.

It may be understood that, if a first HRTF corresponding to an $m^{th}$ virtual speaker is modified to become a third target HRTF, an $m^{th}$ first audio signal output by the $m^{th}$ virtual speaker is convolved with the third target HRTF, to obtain an $m^{th}$ first convolved audio signal. If a first HRTF corresponding to an $m^{th}$ virtual speaker is modified to become a fifth target HRTF, an $m^{th}$ first audio signal output by the $m^{th}$ virtual speaker is convolved with the fifth target HRTF, to obtain an $m^{th}$ first convolved audio signal. If a first HRTF corresponding to an $m^{th}$ virtual speaker is not modified, an $m^{th}$ first audio signal output by the $m^{th}$ virtual speaker is convolved with the first HRTF, to obtain an $m^{th}$ first convolved audio signal.

In an embodiment, a high-band impulse response of a first HRTF corresponding to a virtual speaker that is far away from a current left ear position is modified by using the first modification factor. In addition, a high-band impulse response of a first HRTF corresponding to a virtual speaker that is close to the current left ear position is modified by using the fifth modification factor. The first modification factor is inversely proportional to the fifth modification factor. It is equivalent that, impact on a second target audio signal caused by a high-band signal in a first audio signal output by the virtual speaker that is far away from the current left ear position (in other words, that is close to a current right ear position) is reduced; and impact on a first target audio signal caused by a high-band signal in a first audio signal output by the virtual speaker that is close to the current left ear position (in other words, that is far away from the current right ear position) is enhanced. This can further reduce crosstalk between the first target audio signal and the second target audio signal.

Figure 12:
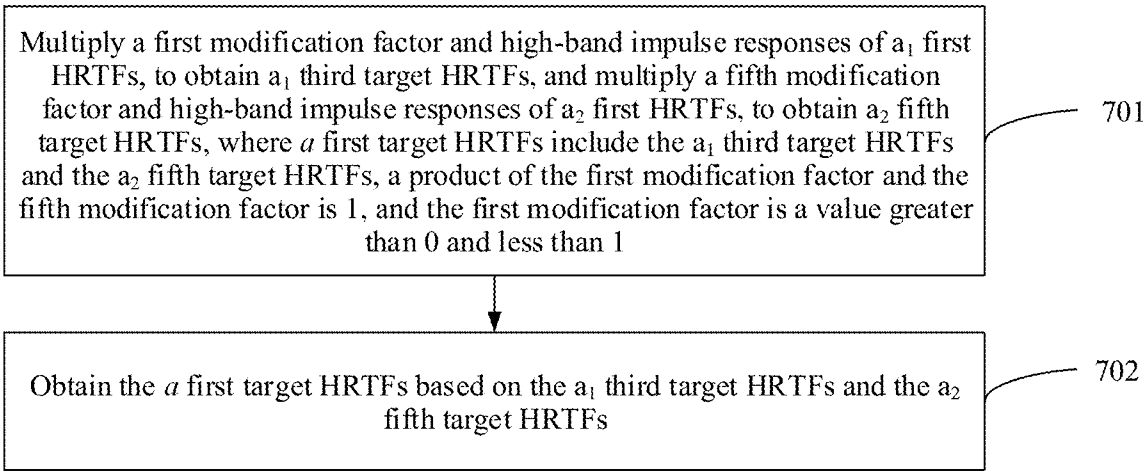
FIG. 12 is a flowchart of an audio processing method according to an embodiment of this application.

To maximally ensure that an order of magnitude of energy of the first target audio signal is the same as an order of magnitude of energy of a third target audio signal obtained based on M first HRTFs and M first audio signals, this embodiment is further improved on the basis of the foregoing embodiment. FIG. 12 is a flowchart of an audio processing method according to an embodiment of this application. Referring to FIG. 12, the method in this embodiment includes the following operations.

Operation S701: Multiply a first modification factor and high-band impulse responses of $a_1$ first HRTFs, to obtain $a_1$ third target HRTFs, and multiply a fifth modification factor and high-band impulse responses of $a_2$ first HRTFs, to obtain $a_2$ fifth target HRTFs, where a first target HRTFs include the $a_1$ third target HRTFs and the $a_2$ fifth target HRTFs, a product of the first modification factor and the fifth modification factor is 1, and the first modification factor is a value greater than 0 and less than 1.

Operation S702: Obtain the a first target HRTFs based on the $a_1$ third target HRTFs and the $a_2$ fifth target HRTFs.

Specifically, for operation S701, refer to the descriptions in operation S601 in the foregoing embodiment.

The obtaining the a first target HRTFs based on the $a_1$ third target HRTFs and the $a_2$ fifth target HRTFs in operation S702 may include the following two implementations.

In an embodiment, a third modification factor and each impulse response included in the $a_1$ third target HRTFs are multiplied to obtain $a_1$ sixth target HRTFs, and a sixth modification factor and each impulse response included in the $a_2$ fifth target HRTFs are multiplied, to obtain $a_2$ seventh target HRTFs, where the a first target HRTFs include the $a_1$ sixth target HRTFs and the $a_2$ seventh target HRTFs.

In an embodiment, for each third target HRTF in the $a_1$ third target HRTFs, the third modification factor and each impulse response included in the third target HRTF are multiplied to obtain a sixth target HRTF corresponding to the third target HRTF. In this way, the $a_1$ sixth target HRTFs are obtained.

In an embodiment, the third modification factor may be a preset value greater than 1.

For each fifth target HRTF in the $a_2$ fifth target HRTFs, the sixth modification factor and each impulse response included in the fifth target HRTF are multiplied to obtain a seventh target HRTF corresponding to the fifth target HRTF. In this way, the $a_2$ seventh target HRTFs are obtained.

In an embodiment, the sixth modification factor may be a preset value less than 1.

In this case, the a first target HRTFs include the $a_1$ sixth target HRTFs and the $a_2$ seventh target HRTFs.

It may be understood that, if a first HRTF corresponding to an $m^{th}$ virtual speaker is modified to become a sixth target HRTF, an $m^{th}$ first audio signal output by the $m^{th}$ virtual speaker is convolved with the sixth target HRTF, to obtain an $m^{th}$ first convolved audio signal. If a first HRTF corresponding to an $m^{th}$ virtual speaker is modified to become a seventh target HRTF, an $m^{th}$ first audio signal output by the $m^{th}$ virtual speaker is convolved with the seventh target HRTF, to obtain an $m^{th}$ first convolved audio signal. If a first HRTF corresponding to an $m^{th}$ virtual speaker is not modified, an $m^{th}$ first audio signal output by the $m^{th}$ virtual speaker is convolved with the first HRTF, to obtain an $m^{th}$ first convolved audio signal.

A purpose of this implementation is to maximally ensure that the order of magnitude of energy of the first target audio signal obtained based on the a first target HRTFs, c first HRTFs, and the M first audio signals is the same as the order of magnitude of energy of the third target audio signal obtained based on the M first HRTFs and the M first audio signals.

In an embodiment, for one third target HRTF, a first value and all impulse responses included in the one third target HRTF are multiplied, to obtain a sixth target HRTF corresponding to the one third target HRTF, where the first value is a ratio of a first sum of squares to a second sum of squares, the first sum of squares is a sum of squares of all impulse responses included in a first HRTF corresponding to the one third target HRTF, and the second sum of squares is a sum of squares of all impulse responses included in the one third target HRTF. For one fifth target HRTF, a third value and all impulse responses included in the one fifth target HRTF are multiplied, to obtain a seventh target HRTF corresponding to the one fifth target HRTF, where the third value is a ratio of a fifth sum of squares to a sixth sum of squares, the fifth sum of squares is a sum of squares of all impulse responses included in a first HRTF corresponding to the one fifth target HRTF, and the sixth sum of squares is a sum of squares of all impulse responses included in the one fifth target HRTF. The a first target HRTFs include $a_1$ sixth target HRTFs and $a_2$ seventh target HRTFs.

In an embodiment, for one third target HRTF, a sum of squares of all impulse responses included in the one third target HRTF is obtained, that is, a second sum of squares $Q_2$ is obtained; and a sum of squares all impulse responses included in a first HRTF corresponding to the one third target HRTF is obtained, that is, a first sum of squares $Q_1$ is obtained. Then, a first value is obtained by using $Q_1/Q_2$. Each impulse response included in the one third target HRTF is multiplied by the first value to obtain a sixth target HRTF corresponding to the one third target HRTF. In this way, the $a_1$ sixth target HRTFs are obtained.

The first HRTF corresponding to the third target HRTF is the same as that described in the embodiment shown in FIG. 8, and details are not described herein again.

For one fifth target HRTF, a sum of squares of all impulse responses included in the one fifth target HRTF is obtained, that is, a fifth sum of squares $Q_5$ is obtained; and a sum of squares all impulse responses included in a first HRTF corresponding to the one fifth target HRTF is obtained, that is, a sixth sum of squares $Q_6$ is obtained. Then, a third value is obtained by using $Q_5/Q_6$. Each impulse response included in the one fifth target HRTF is multiplied by the third value to obtain a seventh target HRTF corresponding to the one fifth target HRTF. In this way, the $a_2$ seventh target HRTFs are obtained.

In this case, the a first target HRTFs include the $a_1$ sixth target HRTFs and the $a_2$ seventh target HRTFs.

For the first HRTF corresponding to the fifth target HRTF, refer to the descriptions of the first HRTF corresponding to the third target HRTF. Details are not described herein again.

In this implementation, it can be ensured that the order of magnitude of energy of the first target audio signal is the same as the order of magnitude of energy of the third target audio signal.

According to the method in this embodiment, crosstalk between the first target audio signal and the second target audio signal can be further reduced, and it can be maximally ensured that the order of magnitude of energy of the first target audio signal is the same as the order of magnitude of energy of the third target audio signal.

Further, a method for modifying, in a scenario in which "$b=b_1+b_2$, the $b_1$ second HRTFs are $b_1$ second HRTFs to which $b_1$ virtual speakers located on the second side of the target center correspond, and the $b_2$ second HRTFs are $b_2$ second HRTFs to which $b_2$ virtual speakers on the first side of the target center correspond", high-band impulse responses of the b second HRTFs to obtain b second target HRTFs is described.

Figure 13:
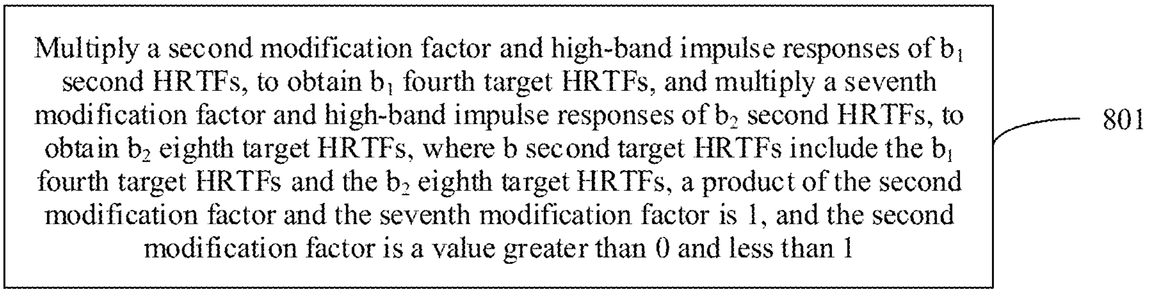
FIG. 13 is a flowchart of an audio processing method according to an embodiment of this application.

FIG. 13 is a flowchart of an audio processing method according to an embodiment of this application. Referring to FIG. 13, the method in this embodiment includes the following operation.

Operation S801: Multiply a second modification factor and high-band impulse responses of $b_1$ second HRTFs, to obtain $b_1$ fourth target HRTFs, and multiply a seventh modification factor and high-band impulse responses of $b_2$ second HRTFs, to obtain $b_2$ eighth target HRTFs, where b second target HRTFs include the $b_1$ fourth target HRTFs and the $b_2$ eighth target HRTFs, a product of the second modification factor and the seventh modification factor is 1, and the second modification factor is a value greater than 0 and less than 1.

Specifically, in operation S801, for each second HRTF in the $b_1$ second HRTFs, the second modification factor and an impulse response that corresponds to each frequency greater than a preset frequency and that is included in the second HRTF are multiplied, to obtain a modified second HRTF, namely, a fourth target HRTF corresponding to the second HRTF. In this way, the $b_1$ fourth target HRTFs are obtained.

For each second HRTF in the $b_2$ second HRTFs, the seventh modification factor and an impulse response that corresponds to each frequency greater than a preset frequency and that is included in the second HRTF are multiplied, to obtain a modified second HRTF, namely, an eighth target HRTF corresponding to the second HRTF. In this way, the $b_2$ eighth target HRTFs are obtained.

A meaning of the second modification factor is the same as that in the embodiment shown in FIG. 9, and details are not described herein again. A product of the seventh modification factor and the second modification factor is 1. In other words, the seventh modification factor is inversely proportional to the second modification factor.

It may be understood that, if a second HRTF corresponding to an $m^{th}$ virtual speaker is modified to become a fourth target HRTF, an $m^{th}$ first audio signal output by the $m^{th}$ virtual speaker is convolved with the fourth target HRTF, to obtain an $m^{th}$ second convolved audio signal. If a second HRTF corresponding to an $m^{th}$ virtual speaker is modified to become an eighth target HRTF, an $m^{th}$ first audio signal output by the $m^{th}$ virtual speaker is convolved with the eighth target HRTF, to obtain an m' second convolved audio signal. If a second HRTF corresponding to an $m^{th}$ virtual speaker is not modified, an $m^{th}$ first audio signal output by the $m^{th}$ virtual speaker is convolved with the second HRTF, to obtain an $m^{th}$ second convolved audio signal.

In an embodiment, a high-band impulse response of a second HRTF corresponding to a virtual speaker that is far away from the right ear is modified by using the second modification factor. In addition, a high-band impulse response of a second HRTF corresponding to a virtual speaker that is close to the right ear is modified by using the seventh modification factor. The second modification factor is inversely proportional to the seventh modification factor. It is equivalent that, impact on a first target audio signal caused by a high-band signal in a first audio signal output by the virtual speaker that is far away from a current right ear position (in other words, that is close to a current left ear position) is reduced; and impact on a second target audio signal caused by a high-band signal in a first audio signal output by a virtual speaker that is close to the current right ear position (in other words, that is far away the current left ear position) is enhanced. This can further reduce crosstalk between the first target audio signal and the second target audio signal.

Figure 14:
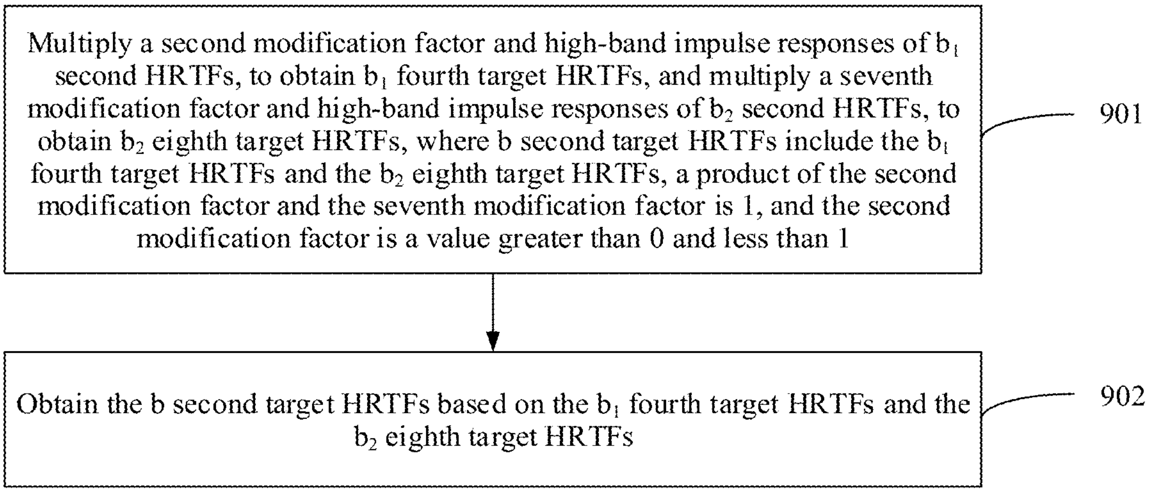
FIG. 14 is a flowchart of an audio processing method according to an embodiment of this application.

To maximally ensure that an order of magnitude of energy of the second target audio signal is the same as an order of magnitude of energy of a fourth target audio signal obtained based on M second HRTFs and M first audio signals, this embodiment is improved on the basis of the foregoing embodiment. FIG. 14 is a flowchart of an audio processing method according to an embodiment of this application. Referring to FIG. 14, the method in this embodiment includes the following operations.

Operation S901: Multiply a second modification factor and high-band impulse responses of $b_1$ second HRTFs, to obtain $b_1$ fourth target HRTFs, and multiply a seventh modification factor and high-band impulse responses of $b_2$ second HRTFs, to obtain $b_2$ eighth target HRTFs, where b second target HRTFs include the $b_1$ fourth target HRTFs and the $b_2$ eighth target HRTFs, a product of the second modification factor and the seventh modification factor is 1, and the second modification factor is a value greater than 0 and less than 1.

Operation S902: Obtain the b second target HRTFs based on the $b_1$ fourth target HRTFs and the $b_2$ eighth target HRTFs.

Specifically, for operation S901, refer to the descriptions of operation S801 in the foregoing embodiment.

The obtaining the b second target HRTFs based on the $b_1$ fourth target HRTFs and the $b_2$ eighth target HRTFs in operation S902 may include the following two implementations.

In a first implementation, a fourth modification factor and each impulse response included in the $b_1$ fourth target HRTFs are multiplied, to obtain $b_1$ ninth target HRTFs, and an eighth modification factor and each impulse response included in the $b_2$ eighth target HRTFs are multiplied, to obtain $b_2$ tenth target HRTFs, where the b second target HRTFs include the $b_1$ ninth target HRTFs and the $b_2$ tenth target HRTFs.

In an embodiment, for each fourth target HRTF in the $b_1$ fourth target HRTFs, the fourth modification factor and each impulse response included in the fourth target HRTF are multiplied to obtain a ninth target HRTF corresponding to the fourth target HRTF. In this way, the $b_1$ ninth target HRTFs are obtained.

In an embodiment, the fourth modification factor may be a preset value greater than 1.

For each eighth target HRTF in the $b_2$ eighth target HRTFs, the eighth modification factor and each impulse response included in the eighth target HRTF are multiplied to obtain a tenth target HRTF corresponding to the eighth target HRTF. In this way, the $b_2$ tenth target HRTFs are obtained.

In an embodiment, the eighth modification factor may be a preset value greater than 0 and less than 1.

In this case, the b second target HRTFs include the $b_1$ ninth target HRTFs and the $b_2$ tenth target HRTFs.

It may be understood that, if a second HRTF corresponding to an $m^{th}$ virtual speaker is modified to become a ninth target HRTF, an $m^{th}$ first audio signal output by the $m^{th}$ virtual speaker is convolved with the ninth target HRTF, to obtain an $m^{th}$ second convolved audio signal. If a second HRTF corresponding to an $m^{th}$ virtual speaker is modified to become a tenth target HRTF, an $m^{th}$ first audio signal output by the $m^{th}$ virtual speaker is convolved with the tenth target HRTF, to obtain an $m^{th}$ second convolved audio signal. If a second HRTF corresponding to an $m^{th}$ virtual speaker is not modified, an $m^{th}$ first audio signal output by the $m^{th}$ virtual speaker is convolved with the second HRTF, to obtain an $m^{th}$ second convolved audio signal.

A purpose of this implementation is to maximally ensure that the order of magnitude of energy of the second target audio signal obtained based on the b second target HRTFs, d second HRTFs, and the M first audio signals is the same as the order of magnitude of energy of the fourth target audio signal obtained based on the M second HRTFs and the M first audio signals.

In a second implementation, for one fourth target HRTF, a second value and all impulse responses included in the one fourth target HRTF are multiplied, to obtain a ninth target HRTF corresponding to the one fourth target HRTF, where the second value is a ratio of a third sum of squares to a fourth sum of squares, the third sum of squares is a sum of squares of all impulse responses included in a second HRTF corresponding to the one fourth target HRTF, and the fourth sum of squares is a sum of squares of all impulse responses included in the one fourth target HRTF. For one eighth target HRTF, a fourth value and all impulse responses included in the one eighth target HRTF are multiplied, to obtain a tenth target HRTF corresponding to the one eighth target HRTF, where the fourth value is a ratio of a seventh sum of squares to an eighth sum of squares, the seventh sum of squares is a sum of squares of all impulse responses included in a second HRTF corresponding to the one eighth target HRTF, and the eighth sum of squares is a sum of squares of all impulse responses included in the one eighth target HRTF. The b second target HRTFs include $b_1$ ninth target HRTFs and $b_2$ tenth target HRTFs.

In an embodiment, for one fourth target HRTF, a sum of squares of all impulse responses included in the one fourth target HRTF is obtained, that is, a fourth sum of squares $Q_4$ is obtained; and a sum of squares all impulse responses included in a second HRTF corresponding to the one fourth target HRTF is obtained, that is, a third sum of squares $Q_3$ is obtained. Then, a second value is obtained by using $Q_3/Q_4$. Each impulse response included in the one fourth target HRTF is multiplied by the second value to obtain a ninth target HRTF corresponding to the one fourth target HRTF. In this way, the $b_1$ ninth target HRTFs are obtained.

The second HRTF corresponding to the fourth target HRTF is the same as that described in the embodiment shown in FIG. 6, and details are not described herein again.

For one eighth target HRTF, a sum of squares of all impulse responses included in the one eighth target HRTF is obtained, that is, a seventh sum of squares $Q_7$ is obtained; and a sum of squares of all impulse responses included in a second HRTF corresponding to the one eighth target HRTF is obtained, that is, an eighth sum of squares $Q_8$ is obtained. Then, a fourth value is obtained by using $Q_7/Q_8$. Each impulse response included in the one eighth target HRTF is multiplied by the fourth value to obtain a tenth target HRTF corresponding to the one eighth target HRTF. In this way, the $b_2$ tenth target HRTFs are obtained.

In this case, the b second target HRTFs include the $b_1$ ninth target HRTFs and the $b_2$ tenth target HRTFs.

For the second HRTF corresponding to the eighth target HRTF, refer to the descriptions of the second HRTF corresponding to the fourth target HRTF. Details are not described herein again.

In this implementation, it can be ensured that the order of magnitude of energy of the second target audio signal and the order of magnitude of energy of the fourth target audio signal.

According to the method in this embodiment, crosstalk between the first target audio signal and the second target audio signal can be further reduced, and it can be maximally ensured that the order of magnitude of energy of the second target audio signal is the same as the order of magnitude of energy of the fourth target audio signal.

It may be understood that the embodiment shown in either of FIG. 7 and FIG. 8 may be combined with the embodiment shown in any one of FIG. 9, FIG. 10, FIG. 13, and FIG. 14, and the embodiment shown in either of FIG. 11 and FIG. 12 may be combined with the embodiment shown in any one of FIG. 9, FIG. 10, FIG. 13, and FIG. 14.

Figure 15:
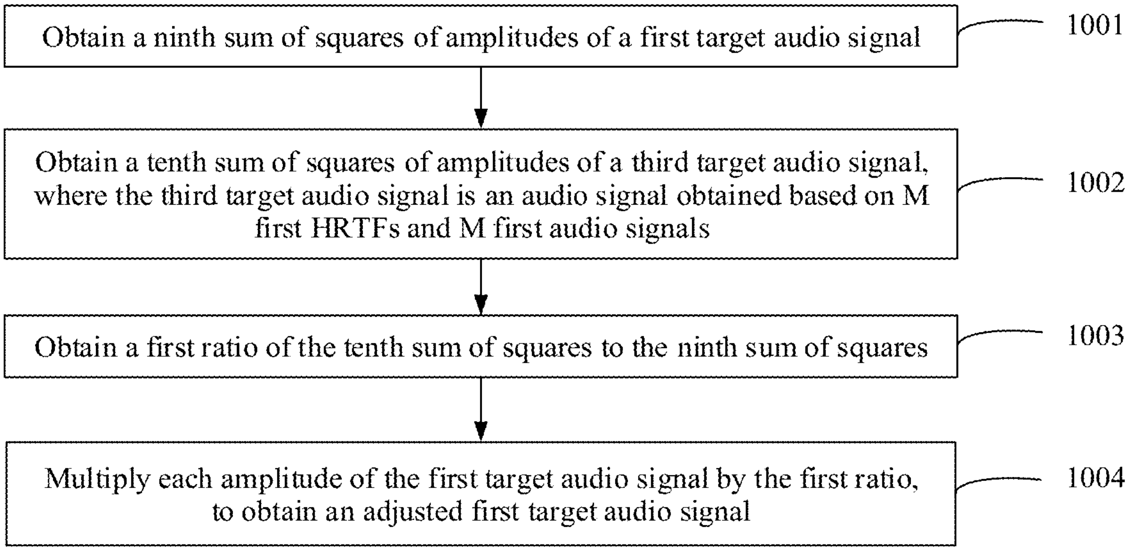
FIG. 15 is a flowchart of an audio processing method according to an embodiment of this application.

In an embodiment in the foregoing embodiments shown in FIG. 8, FIG. 10, FIG. 12, and FIG. 14, an HRTF is modified to maximally ensure that an order of magnitude of energy of a second target audio signal is the same as an order of magnitude of energy of a fourth target audio signal, and that an order of magnitude of energy of a first target audio signal is the same as an order of magnitude of energy of a third target audio signal. Alternatively, the first target audio signal may be adjusted to ensure that the order of magnitude of energy of the second target audio signal is the same as the order of magnitude of energy of the fourth target audio signal, and the order of magnitude of energy of the first target audio signal is the same as the order of magnitude of energy of the third target audio signal. FIG. 15 is a flowchart of an audio processing method according to an embodiment of this application. Referring to FIG. 15, the method in this embodiment includes the following operations.

Operation S1001: Obtain a ninth sum of squares of amplitudes of a first target audio signal.

Operation S1002: Obtain a tenth sum of squares of amplitudes of a third target audio signal, where the third target audio signal is an audio signal obtained based on M first HRTFs and M first audio signals.

Operation S1003: Obtain a first ratio of the tenth sum of squares to the ninth sum of squares.

Operation S1004: Multiply each amplitude of the first target audio signal by the first ratio, to obtain an adjusted first target audio signal.

In an embodiment, operation S1001 to operation S1004 are "adjusting an order of magnitude of energy of the first target audio signal to a first order of magnitude, where the first order of magnitude is an order of magnitude of energy of the third target audio signal, and the third target audio signal is obtained based on the M first HRTFs and the M first audio signals."

Further, to improve rendering efficiency, after the first target audio signal is obtained, the order of magnitude of energy of the first target audio signal may alternatively be adjusted to a preset order of magnitude. In this way, the third target audio signal does not need to be obtained.

In this embodiment, it is ensured that the adjusted order of magnitude of energy of the first target audio signal is the same as the order of magnitude of energy of the third target audio signal.

Figure 16:
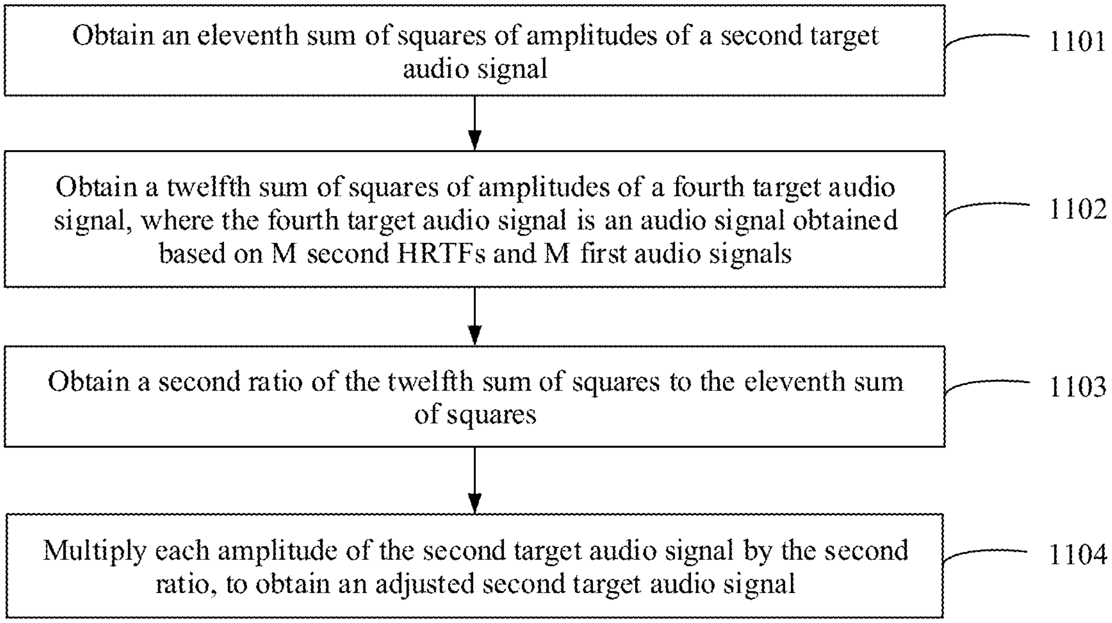
FIG. 16 is a flowchart of an audio processing method according to an embodiment of this application.

FIG. 16 is a flowchart of an audio processing method according to an embodiment of this application. Referring to FIG. 16, the method in this embodiment includes the following operations.

Operation S1101: Obtain an eleventh sum of squares of amplitudes of a second target audio signal.

Operation S1102: Obtain a twelfth sum of squares of amplitudes of a fourth target audio signal, where the fourth target audio signal is an audio signal obtained based on M second HRTFs and M first audio signals.

Operation S1103: Obtain a second ratio of the twelfth sum of squares to the eleventh sum of squares.

Operation S1104: Multiply each amplitude of the second target audio signal by the second ratio, to obtain an adjusted second target audio signal.

In an embodiment, operation S1101 to operation S1104 are an implementation of "adjusting an order of magnitude of energy of the second target audio signal to a second order of magnitude, where the second order of magnitude is an order of magnitude of energy of the fourth target audio signal, and the fourth target audio signal is an audio signal obtained based on the M second HRTFs and the M first audio signals".

Further, to improve rendering efficiency, after the second target audio signal is obtained, the order of magnitude of energy of the second target audio signal may alternatively be adjusted to a preset order of magnitude. In this way, the fourth target audio signal does not need to be obtained.

In an embodiment, it is ensured that the order of magnitude of energy of the second target audio signal is the same as the order of magnitude of energy of the fourth target audio signal.

Either of the embodiments shown in FIG. 7 and FIG. 11 may be combined with the embodiment shown in FIG. 15, and either of the embodiments shown in FIG. 9 and FIG. 13 may be combined with the embodiment shown in FIG. 16.

For functions implemented by an audio signal receive end, the foregoing describes the solutions provided in the embodiments of this application. It may be understood that, to implement the foregoing functions, the audio signal receive end includes corresponding hardware structures and/or software modules for performing the functions. With reference to units and algorithm operations in the examples described in the embodiments disclosed in this application, the embodiments of this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of this application.

In the embodiments of this application, the audio signal receive end may be divided into functional modules based on the foregoing method examples. For example, each function module may be obtained through division based on each corresponding function, or two or more functions may be integrated into one processing unit. The foregoing integrated unit may be implemented in a form of hardware, or may be implemented in a form of a software functional module. It should be noted that, in the embodiments of this application, division into modules is an example, and is merely a logical function division. During actual implementation, there may be another division manner.

Figure 17:
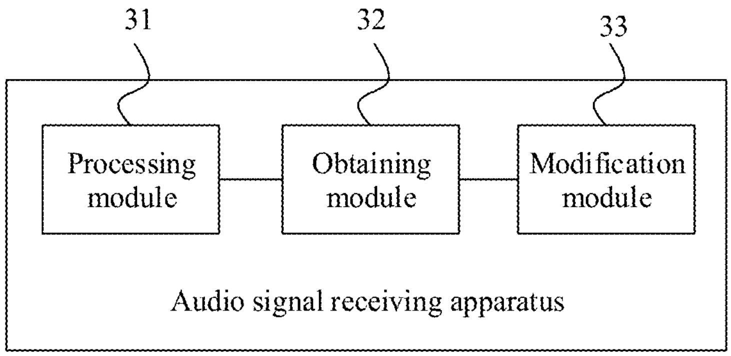
FIG. 17 is a schematic structural diagram of an audio processing apparatus according to an embodiment of this application.

FIG. 17 is a schematic structural diagram of an audio processing apparatus according to an embodiment of this application. Referring to FIG. 17, the apparatus in this embodiment includes a processing module 31, an obtaining module 32, and a modification module 33.

The processing module 31 is configured to obtain M first audio signals by processing a to-be-processed audio signal by M virtual speakers, where M is a positive integer, and the M virtual speakers are in a one-to-one correspondence with the M first audio signals.

The obtaining module 32 is configured to obtain M first head-related transfer functions HRTFs and M second HRTFs, where the M first HRTFs are HRTFs to which the M first audio signals correspond from the M virtual speakers to a left ear position, the M second HRTFs are HRTFs to which the M first audio signals correspond from the M virtual speakers to a right ear position, the M first HRTFs are in a one-to-one correspondence with the M virtual speakers, and the M second HRTFs are in a one-to-one correspondence with the M virtual speakers.

The modification module 33 is configured to: modify high-band impulse responses of a first HRTFs, to obtain a first target HRTFs, and modify high-band impulse responses of b second HRTFs, to obtain b second target HRTFs, where $1 \le a \le M$, $1 \le b \le M$, and both a and b are integers.

The obtaining module 32 is further configured to: obtain, based on the a first target HRTFs, c first HRTFs, and the M first audio signals, a first target audio signal corresponding to the current left ear position; and obtain, based on d second HRTFs, the b second target HRTFs, and the M first audio signals, a second target audio signal corresponding to the current right ear position. The c first HRTFs are HRTFs other than the a first HRTFs in the M first HRTFs, the d second HRTFs are HRTFs other than the b second HRTFs in the M second HRTFs, $a+c=M$, and $b+d=M$.

The apparatus in this embodiment may be configured to perform the technical solutions of the foregoing method embodiments. Implementation principles and technical effects of the apparatus are similar to those of the foregoing method embodiments. Details are not described herein again.

In an embodiment, the obtaining module 32 is configured to:

obtain M first positions of the M virtual speakers relative to the current left ear position; and determine, based on the M first positions and correspondences, that M HRTFs corresponding to the M first positions are the M first HRTFs, where the correspondences are prestored correspondences between a plurality of preset positions and a plurality of HRTFs.

In an embodiment, the obtaining module 32 is configured to:

obtain M second positions of the M virtual speakers relative to the current right ear position; and determine, based on the M second positions and the correspondences, that M HRTFs corresponding to the M second positions are the M second HRTFs, where the correspondences are prestored correspondences between a plurality of preset positions and a plurality of HRTFs.

In an embodiment, the obtaining module 32 is configured to:

convolve each of the M first audio signals with a corresponding HRTF in all HRTFs of the a first target HRTFs and the c first HRTFs, to obtain M first convolved audio signals; and obtain the first target audio signal based on the M first convolved audio signals.

In an embodiment, the obtaining module 32 is configured to:

convolve each of the M first audio signals with a corresponding HRTF in all HRTFs of the d second HRTFs and the b second target HRTFs, to obtain M second convolved audio signals; and obtain the second target audio signal based on the M second convolved audio signals.

In an embodiment, the a first HRTFs are a first HRTFs to which a virtual speakers located on a first side of a target center correspond, the first side is a side that is of the target center and that is far away from the current left ear position, and the target center is a center of three-dimensional space corresponding to the M virtual speakers.

In an embodiment, the modification module 33 is configured to:

multiply a first modification factor and the high-band impulse responses included in the a first HRTFs, to obtain the a first target HRTFs, where the first modification factor is greater than 0 and less than 1.

Alternatively, in an embodiment, the modification module 33 is configured to:

multiply a first modification factor and the high-band impulse responses included in the a first HRTFs, to obtain a third target HRTFs, where the first modification factor is a value greater than 0 and less than 1; and multiply a third modification factor and each impulse response included in the a third target HRTFs, to obtain the a first target HRTFs, where the third modification factor is a value greater than 1.

Alternatively, in an embodiment, the modification module 33 is configured to:

multiply a first modification factor and the high-band impulse responses included in the a first HRTFs, to obtain a third target HRTFs, where the first modification factor is a value greater than 0 and less than 1; and for one third target HRTF, multiply a first value and all impulse responses included in the one third target HRTF, to obtain a first target HRTF corresponding to the one third target HRTF, where the first value is a ratio of a first sum of squares to a second sum of squares, the first sum of squares is a sum of squares of all impulse responses included in a first HRTF corresponding to the one third target HRTF, and the second sum of squares is a sum of squares of all impulse responses included in the one third target HRTF.

In an embodiment, the b second HRTFs are b second HRTFs to which b virtual speakers located on a second side of the target center correspond, the second side is a side that is of the target center and that is far away from the current right ear position, and the target center is the center of the three-dimensional space corresponding to the M virtual speakers.

In an embodiment, the modification module 33 is configured to:

multiply a second modification factor and the high-band impulse responses included in the b second HRTFs, to obtain the b second target HRTFs, where the second modification factor is a value greater than 0 and less than 1. Alternatively, in this possible design, the modification module is configured to:

multiply a second modification factor and the high-band impulse responses included in the b second HRTFs, to obtain the b fourth target HRTFs, where the second modification factor is a value greater than 0 and less than 1; and multiply a fourth modification factor and each impulse response included in the b fourth target HRTFs, to obtain the b second target HRTFs, where the fourth modification factor is a value greater than 1.

Alternatively, in an embodiment, the modification module is configured to:

multiply a second modification factor and the high-band impulse responses included in the b second HRTFs, to obtain the b fourth target HRTFs, where the second modification factor is a value greater than 0 and less than 1; and for one fourth target HRTF, multiply a second value and all impulse responses included in the one fourth target HRTF, to obtain a second target HRTF corresponding to the one fourth target HRTF, where the second value is a ratio of a third sum of squares to a fourth sum of squares, the third sum of squares is a sum of squares of all impulse responses included in a second HRTF corresponding to the one fourth target HRTF, and the fourth sum of squares is a sum of squares of all impulse responses included in the one fourth target HRTF.

In an embodiment, $a=a_1+a_2$. The $a_1$ first HRTFs are $a_1$ first HRTFs to which $a_1$ virtual speakers located on a first side of a target center correspond, and the $a_2$ first HRTFs are $a_2$ first HRTFs to which $a_2$ virtual speakers located on a second side of the target center correspond. The first side is a side that is of the target center and that is far away from the current left ear position, and the second side is a side that is of the target center and that is far away from the current right ear position. The target center is a center of three-dimensional space corresponding to the M virtual speakers.

In an embodiment, the modification module 33 is configured to:

multiply a first modification factor and high-band impulse responses of the $a_1$ first HRTFs, to obtain $a_1$ third target HRTFs, and multiply a fifth modification factor and high-band impulse responses of the $a_2$ first HRTFs, to obtain $a_2$ fifth target HRTFs, where the a first target HRTFs include the $a_1$ third target HRTFs and the $a_2$ fifth target HRTFs.

A product of the first modification factor and the fifth modification factor is 1, and the first modification factor is a value greater than 0 and less than 1.

Alternatively, in an embodiment, the modification module 33 is configured to:

multiply a first modification factor and high-band impulse responses of the $a_1$ first HRTFs, to obtain $a_1$ third target HRTFs, and multiply a fifth modification factor and high-band impulse responses of the $a_2$ first HRTFs, to obtain $a_2$ fifth target HRTFs, where a product of the first modification factor and the fifth modification factor is 1, and the first modification factor is a value greater than 0 and less than 1; and multiply a third modification factor and each impulse response included in the $a_1$ third target HRTFs, to obtain $a_1$ sixth target HRTFs, and multiply a sixth modification factor and each impulse response included in the $a_2$ fifth target HRTFs, to obtain $a_2$ seventh target HRTFs, where the a first target HRTFs include the $a_1$ sixth target HRTFs and the $a_2$ seventh target HRTFs, the third modification factor is a value greater than 1, and the sixth modification factor is a value greater than 0 and less than 1.

Alternatively, in an embodiment, the modification module 33 is configured to:

multiply a first modification factor and high-band impulse responses of the $a_1$ first HRTFs, to obtain $a_1$ third target HRTFs, and multiply a fifth modification factor and high-band impulse responses of the $a_2$ first HRTFs, to obtain $a_2$ fifth target HRTFs, where a product of the first modification factor and the fifth modification factor is 1, and the first modification factor is a value greater than 0 and less than 1; and for one third target HRTF, multiply a first value and all impulse responses included in the one third target HRTF, to obtain a sixth target HRTF corresponding to the one third target HRTF, where the first value is a ratio of a first sum of squares to a second sum of squares, the first sum of squares is a sum of squares of all impulse responses included in a first HRTF corresponding to the one third target HRTF, and the second sum of squares is a sum of squares of all impulse responses included in the one third target HRTF; and for one fifth target HRTF, multiply a third value and all impulse responses included in the one fifth target HRTF, to obtain a seventh target HRTF corresponding to the one fifth target HRTF, where the third value is a ratio of a fifth sum of squares to a sixth sum of squares, the fifth sum of squares is a sum of squares of all impulse responses included in a first HRTF corresponding to the one fifth target HRTF, and the sixth sum of squares is a sum of squares of all impulse responses included in the one fifth target HRTF; and the a first target HRTFs include the at sixth target HRTFs and $a_2$ seventh target HRTFs.

In an embodiment, $b=b_1+b_2$. The $b_1$ second HRTFs are $b_1$ second HRTFs to which $b_1$ virtual speakers located on the second side of the target center correspond, and the $b_2$ second HRTFs are $b_2$ second HRTFs to which $b_2$ virtual speakers located on the first side of the target center correspond. The first side is a side that is of the target center and that is far away from the current left ear position, and the second side is a side that is of the target center and that is far away from the current right ear position. The target center is the center of the three-dimensional space corresponding to the M virtual speakers.

In an embodiment, the modification module 33 is configured to:

multiply a second modification factor and high-band impulse responses of the $b_1$ second HRTFs, to obtain $b_1$ fourth target HRTFs, and multiply a seventh modification factor and high-band impulse responses of the $b_2$ second HRTFs, to obtain $b_2$ eighth target HRTFs, where the b second target HRTFs include the $b_1$ fourth target HRTFs and the $b_2$ eighth target HRTFs.

A product of the second modification factor and the seventh modification factor is 1, and the second modification factor is a value greater than 0 and less than 1.

Alternatively, in an embodiment, the modification module 33 is configured to:

multiply a second modification factor and high-band impulse responses of the $b_1$ second HRTFs, to obtain $b_1$ fourth target HRTFs, and multiply a seventh modification factor and high-band impulse responses of the $b_2$ second HRTFs, to obtain $b_2$ eighth target HRTFs, where a product of the second modification factor and the seventh modification factor is 1, and the second modification factor is a value greater than 0 and less than 1; and multiply a fourth modification factor and each impulse response included in the $b_1$ fourth target HRTFs, to obtain $b_1$ ninth target HRTFs, and multiply an eighth modification factor and each impulse response included in the $b_2$ eighth target HRTFs, to obtain $b_2$ tenth target HRTFs, where the b second target HRTFs include the $b_1$ ninth target HRTFs and the $b_2$ tenth target HRTFs, the fourth modification factor is a value greater than 1, and the eighth modification factor is a value greater than 0 and less than 1.

Alternatively, in an embodiment, the modification module 33 is configured to:

multiply a second modification factor and high-band impulse responses of the $b_1$ second HRTFs, to obtain $b_1$ fourth target HRTFs, and multiply a seventh modification factor and high-band impulse responses of the $b_2$ second HRTFs, to obtain $b_2$ eighth target HRTFs, where a product of the second modification factor and the seventh modification factor is 1, and the second modification factor is a value greater than 0 and less than 1; and for one fourth target HRTF, multiply a second value and all impulse responses included in the one fourth target HRTF, to obtain a ninth target HRTF corresponding to the one fourth target HRTF, where the second value is a ratio of a third sum of squares to a fourth sum of squares, the third sum of squares is a sum of squares of all impulse responses included in a second HRTF corresponding to the one fourth target HRTF, and the fourth sum of squares is a sum of squares of all impulse responses included in the one fourth target HRTF; and for one eighth target HRTF, multiply a fourth value and all impulse responses included in the one eighth target HRTF, to obtain a tenth target HRTF corresponding to the one eighth target HRTF, where the fourth value is a ratio of a seventh sum of squares to an eighth sum of squares, the seventh sum of squares is a sum of squares of all impulse responses included in a second HRTF corresponding to the one eighth target HRTF, and the eighth sum of squares is a sum of squares of all impulse responses included in the one eighth target HRTF; and the b second target HRTFs include the $b_1$ ninth target HRTFs and $b_2$ tenth target HRTFs.

The apparatus in an embodiment may be configured to perform the technical solutions of the foregoing method embodiments. Implementation principles and technical effects of the apparatus are similar to those of the foregoing method embodiments. Details are not described herein again.

Figure 18:
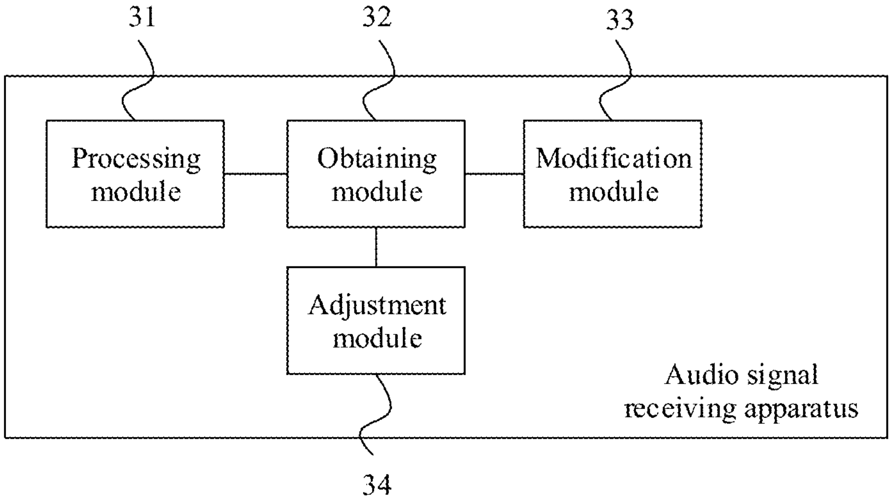
FIG. 18 is a schematic structural diagram of an audio processing apparatus according to an embodiment of this application.

FIG. 18 is a schematic structural diagram of an audio processing apparatus according to an embodiment of this application. Referring to FIG. 18, on the basis of the apparatus shown in FIG. 17, the apparatus in this embodiment further includes an adjustment module 34.

The adjustment module 34 is configured to: adjust an order of magnitude of energy of the first target audio signal to a first order of magnitude, where the first order of magnitude is an order of magnitude of energy of the third target audio signal, and the third target audio signal is obtained based on the M first HRTFs and the M first audio signals; and adjust an order of magnitude of energy of the second target audio signal to a second order of magnitude, where the second order of magnitude is an order of magnitude of energy of the fourth target audio signal, and the fourth target audio signal is obtained based on the M second HRTFs and the M first audio signals.

The apparatus in an embodiment may be configured to perform the technical solutions of the foregoing method embodiments. Implementation principles and technical effects of the apparatus are similar to those of the foregoing method embodiments. Details are not described herein again.

An embodiment of this application provides a computer-readable storage medium. The computer-readable storage medium stores an instruction, and when the instruction is executed, a computer is enabled to perform the method in the foregoing method embodiment of this application.

In the several embodiments provided in this application, it should be understood that the disclosed apparatus and method may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or in another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware combined with a software functional unit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for processing audio signals, comprising:

obtaining M virtual speakers corresponding to a three-dimensional space, wherein the M virtual speakers include a first virtual speaker and a second virtual speaker, wherein M is a positive integer;

obtaining M audio signals by processing an audio signal by the M virtual speakers, wherein the M audio signals includes a first audio signal corresponding to the first virtual speaker and a second audio signal corresponding to the second virtual speaker;

obtaining M first head-related transfer functions (HRTFs) comprising a third HRTF corresponding to the first audio signal transmitted from the first virtual speaker to a default left ear position;

obtaining M second HRTFs comprising a fourth HRTF corresponding to the second audio signal transmitted from the second virtual speaker to a default right ear position;

modifying high-band impulse responses corresponding to a first quantity of the M first HRTFs to obtain a first quantity of first target HRTFs, wherein the first quantity is not less than 1 and not greater than M, wherein the first quantity of the M first HRTFs comprise the third HRTF;

modifying high-band impulse responses corresponding to a second quantity of the M second HRTFs, to obtain a second quantity of second target HRTFs, wherein the second quantity is not less than 1 and not greater than M, wherein the second quantity of the M second HRTFs comprise the fourth HRTF;

obtaining, based on the first target HRTFs, a first target audio signal corresponding to a current left ear position; and obtaining, based on the second target HRTFs, a second target audio signal corresponding to a current right ear position.

2. The method according to claim 1, wherein correspondences between a plurality of preset positions and a plurality of HRTFs are prestored, and the obtaining M first HRTFs comprises:

obtaining M first positions of the M virtual speakers relative to the current left ear position; and determining, based on the M first positions and the correspondences, the M first HRTFs;

or the obtaining M second HRTFs comprises:

obtaining M second positions of the M virtual speakers relative to the current right ear position; and determining, based on the M second positions and the correspondences, the M second HRTFs.

3. The method according to claim 1, wherein obtaining the first target audio signal comprises:

convolving the first audio signal with the third HRTF to obtain a first convolved audio signal;

and obtaining the first target audio signal at least based on the first convolved audio signal;

or wherein obtaining the second target audio signal comprises:

convolving the second audio signal with the fourth HRTF to obtain a second convolved audio signal; and obtaining the second target audio signal at least based on the second convolved audio signal.

4. The method according to claim 1, wherein the first virtual speaker is located on a first side of a target center that is far away from the current left ear position, and the target center is a center of the three-dimensional space.

5. The method according to claim 4, wherein modifying the high-band impulse responses corresponding to the first quantity of the M first HRTFs to obtain the first quantity of first target HRTFs comprises:

multiplying a first modification factor with a first high-band impulse response corresponding to the third HRTF to obtain a first target HRTF, wherein the first modification factor is greater than 0 and less than 1;

or wherein modifying the high-band impulse responses corresponding to the first quantity of the M first HRTFs to obtain the first quantity of first target HRTFs comprises:

multiplying a first modification factor with a first high-band impulse response corresponding to the third HRTF to obtain a first temporal HRTF, wherein the first modification factor is a value greater than 0 and less than 1; and multiplying a third modification factor with each impulse response corresponding to the first temporal HRTF to obtain a first target HRTF, wherein the third modification factor is greater than 1;

or multiplying a first modification factor with a first high-band impulse response corresponding to the third HRTF to obtain a first temporal HRTF, wherein the first modification factor is greater than 0 and less than 1; and multiplying a first value with each impulse response corresponding to the first temporal HRTF to obtain a first target HRTF, wherein the first value is a ratio of a first sum of squares to a second sum of squares, the first sum of squares is a sum of squares of all impulse responses corresponding to the third HRTF, and the second sum of squares is a sum of squares of all impulse responses corresponding to the first temporal HRTF.

6. The method according to claim 1, wherein the second virtual speaker is located on a second side of a target center that is far away from the current right ear position, and the target center is a center of the three-dimensional space.

7. The method according to claim 6, wherein modifying the high-band impulse responses corresponding to the second quantity of the M second HRTFs to obtain the second quantity of second target HRTFs comprises:

multiplying a second modification factor with a second high-band impulse response corresponding to the fourth HRTF to obtain a second target HRTF, wherein the second modification factor is greater than 0 and less than 1;

or wherein modifying the high-band impulse responses corresponding to the second quantity of the M second HRTFs to obtain the second quantity of second target HRTFs comprises:

multiplying a second modification factor with a second high-band impulse response corresponding to the fourth HRTF to obtain a second temporal HRTF, wherein the second modification factor is greater than 0 and less than 1; and multiplying a fourth modification factor with each impulse response corresponding to the second temporal HRTF to obtain a second target HRTF, wherein the fourth modification factor is greater than 1;

or multiplying a second modification factor with a second high-band impulse response corresponding to the fourth HRTF to obtain a second temporal HRTF, wherein the second modification factor is greater than 0 and less than 1; and multiplying a second value with all impulse responses corresponding to the second temporal HRTF to obtain a sixth target HRTF, wherein the second value is a ratio of a third sum of squares to a fourth sum of squares, the third sum of squares is a sum of squares of all impulse responses corresponding to the fourth HRTF, and the fourth sum of squares is a sum of squares of all impulse responses corresponding to the second temporal HRTF.

8. An apparatus for processing audio signals, comprising:
at least one processor; and
one or more memories coupled to the at least one processor and storing programming instructions, which when executed by the at least one processor, cause the audio signal processing apparatus to:
obtain M virtual speakers corresponding to a three-dimensional space, wherein the M virtual speakers include a first virtual speaker and a second virtual speaker, wherein M is a positive integer;
obtain M audio signals by processing an audio signal by the M virtual speakers, wherein the M audio signals includes a first audio signal corresponding to the first virtual speaker and a second audio signal corresponding to the second virtual speaker;
obtain M first head-related transfer functions (HRTFs) comprising a third HRTF corresponding to the first audio signal transmitted from the first virtual speaker to a default left ear position;
obtain M second HRTFs comprising a fourth HRTF corresponding to the second audio signal transmitted from the second virtual speaker to a default right ear position;
modify high-band impulse responses corresponding to a first quantity of the M first HRTFs to obtain a first quantity of first target HRTFs, wherein the first quantity is not less than 1 and not greater than M, wherein the first quantity of the M first HRTFs comprise the third HRTF;
modify high-band impulse responses corresponding to a second quantity of the M second HRTFs, to obtain a second quantity of second target HRTFs, wherein the second quantity is not less than 1 and not greater than M, wherein the second quantity of the M second HRTFs comprise the fourth HRTF;
obtain, based on the first target HRTFs, a first target audio signal corresponding to a current left ear position; and
obtain, based on the second target HRTFs, a second target audio signal corresponding to a current right ear position.

9. The apparatus according to claim 8, wherein correspondences between a plurality of preset positions and a plurality of HRTFs are prestored;
wherein the programming instructions when executed further cause the audio signal processing apparatus to:
obtain M first positions of the M virtual speakers relative to the current left ear position; and
determine, based on the M first positions and the correspondences, the M first HRTFs;
or
obtain M second positions of the M virtual speakers relative to the current right ear position; and
determine, based on the M second positions and the correspondences, the M second HRTFs.

10. The apparatus according to claim 8, wherein the programming instructions when executed further cause the audio signal processing apparatus to:
convolve the first audio signal with the third HRTF to obtain a first convolved audio signal;
and
obtain the first target audio signal at least based on the first convolved audio signal;
or
convolve the second audio signal with the fourth HRTF to obtain a second convolved audio signal; and
obtain the second target audio signal at least based on the second convolved audio signal.

11. The apparatus according to claim 8, wherein the first virtual speaker is located on a first side of a target center that is far away from the current left ear position, and the target center is a center of the three-dimensional space.

12. The apparatus according to claim 11, wherein the programming instructions when executed further cause the audio signal processing apparatus to:
multiply a first modification factor with a first high-band impulse response corresponding to the third HRTF to obtain a first target HRTF, wherein the first modification factor is greater than 0 and less than 1;
or
multiply a first modification factor with a first high-band impulse response corresponding to the third HRTF to obtain a first temporal HRTF, wherein the first modification factor is greater than 0 and less than 1; and
multiply a third modification factor with each impulse response corresponding to the first temporal HRTF to obtain a first target HRTF, wherein the third modification factor is greater than 1;
or
multiply a first modification factor with a first high-band impulse response corresponding to the third HRTF to obtain a first temporal HRTF, wherein the first modification factor is greater than 0 and less than 1; and
multiply a first value with each impulse response corresponding to the first temporal HRTF to obtain a first target HRTF, wherein the first value is a ratio of a first sum of squares to a second sum of squares, the first sum of squares is a sum of squares of all impulse responses corresponding to the third HRTF, and the second sum of squares is a sum of squares of all impulse responses corresponding to the first temporal HRTF.

13. The apparatus according to claim 8, wherein the second virtual speaker is located on a second side of a target center that is far away from the current right ear position, and the target center is a center of the three-dimensional space.

14. The apparatus according to claim 13, wherein the programming instructions when executed further cause the audio signal processing apparatus to:
multiply a second modification factor with a second high-band impulse response corresponding to the fourth HRTF to obtain a second target HRTF, wherein the second modification factor is greater than 0 and less than 1;
or
multiply a second modification factor with a second high-band impulse response corresponding to the fourth HRTF to obtain a second temporal HRTF, wherein the second modification factor is greater than 0 and less than 1; and
multiply a fourth modification factor with each impulse response corresponding to the second temporal HRTF to obtain a second target HRTF, wherein the fourth modification factor is greater than 1;
or
multiply a second modification factor with a second high-band impulse response corresponding to the fourth HRTF to obtain a second temporal HRTF, wherein the second modification factor is greater than 0 and less than 1; and
multiply a second value with all impulse responses corresponding to the second temporal HRTF to obtain a sixth target HRTF, wherein the second value is a ratio of a third sum of squares to a fourth sum of squares, the third sum of squares is a sum of squares of all impulse responses corresponding to the fourth HRTF, and the fourth sum of squares is a sum of squares of all impulse responses corresponding to the second temporal HRTF.

15. A non-transitory computer readable storage medium, tangibly embodying computer program code, which, when executed by a computer unit, causes the computer unit to perform a method comprising:

obtaining M virtual speakers corresponding to a three-dimensional space, wherein the M virtual speakers include a first virtual speaker and a second virtual speaker, wherein M is a positive integer;

obtaining M audio signals by processing an audio signal by the M virtual speakers, wherein the M audio signals includes a first audio signal corresponding to the first virtual speaker and a second audio signal corresponding to the second virtual speaker;

obtaining M first head-related transfer functions (HRTFs) comprising a third HRTF corresponding to the first audio signal transmitted from the first virtual speaker to a default left ear position;

obtaining M second HRTFs comprising a fourth HRTF corresponding to the second audio signal transmitted from the second virtual speaker to a default right ear position;

modifying high-band impulse responses corresponding to a first quantity of the M first HRTFs to obtain a first quantity of first target HRTFs, wherein the first quantity is not less than 1 and not greater than M, wherein the first quantity of the M first HRTFs comprise the third HRTF;

modifying high-band impulse responses corresponding to a second quantity of the M second HRTFs, to obtain a second quantity of second target HRTFs, wherein the second quantity is not less than 1 and not greater than M, wherein the second quantity of the M second HRTFs comprise the fourth HRTF;

obtaining, based on the first target HRTFs, a first target audio signal corresponding to a current left ear position; and obtaining, based on the second target HRTFs, a second target audio signal corresponding to a current right ear position.

16. The non-transitory computer readable storage medium according to claim 15, wherein correspondences between a plurality of preset positions and a plurality of HRTFs are prestored, and the obtaining M first HRTFs comprises:

obtaining M first positions of the M virtual speakers relative to the current left ear position; and determining, based on the M first positions and the correspondences, the M first HRTFs;

or the obtaining M second HRTFs comprises:

obtaining M second positions of the M virtual speakers relative to the current right ear position; and determining, based on the M second positions and the correspondences, the M second HRTFs.

17. The non-transitory computer readable storage medium according to claim 15, wherein obtaining the first target audio signal comprises:

convolving the first audio signal with the third HRTF to obtain a first convolved audio signal;

and obtaining the first target audio signal at least based on the first convolved audio signal;

or wherein obtaining the second target audio signal comprises:

convolving the second audio signal with the fourth HRTF to obtain a second convolved audio signal; and obtaining the second target audio signal at least based on the second convolved audio signal.

18. The non-transitory computer readable storage medium according to claim 15, wherein the first virtual speaker is located on a first side of a target center that is far away from the current left ear position, and the target center is a center of the three-dimensional space.

19. The non-transitory computer readable storage medium according to claim 18, wherein modifying the high-band impulse responses corresponding to the first quantity of the M first HRTFs to obtain the first quantity of first target HRTFs comprises:

multiplying a first modification factor with a first high-band impulse response corresponding to the third HRTF to obtain a first target HRTF, wherein the first modification factor is greater than 0 and less than 1;

or wherein modifying the high-band impulse responses corresponding to the first quantity of the M first HRTFs to obtain the first quantity of first target HRTFs comprises:

multiplying a first modification factor with a first high-band impulse response corresponding to the third HRTF to obtain a first temporal HRTF, wherein the first modification factor is greater than 0 and less than 1; and multiplying a third modification factor with each impulse response corresponding to the first temporal HRTF to obtain a first target HRTF, wherein the third modification factor is greater than 1;

or multiplying a first modification factor with a first high-band impulse response corresponding to the third HRTF to obtain a first temporal HRTF, wherein the first modification factor is greater than 0 and less than 1; and multiplying a first value with each impulse response corresponding to the first temporal HRTF to obtain a first target HRTF, wherein the first value is a ratio of a first sum of squares to a second sum of squares, the first sum of squares is a sum of squares of all impulse responses corresponding to the third HRTF, and the second sum of squares is a sum of squares of all impulse responses corresponding to the first temporal HRTF.

20. The non-transitory computer readable storage medium according to claim 15, wherein the second virtual speaker is located on a second side of a target center that is far away from the current right ear position, and the target center is a center of the three-dimensional space; and wherein modifying the high-band impulse responses corresponding to the second quantity of the M second HRTFs to obtain the second quantity of second target HRTFs comprises:

multiplying a second modification factor with a second high-band impulse response corresponding to the fourth HRTF to obtain a second target HRTF, wherein the second modification factor is greater than 0 and less than 1;

or wherein modifying the high-band impulse responses corresponding to the second quantity of the M second HRTFs to obtain the second quantity of second target HRTFs comprises:

multiplying a second modification factor with a second high-band impulse response corresponding to the fourth HRTF to obtain a second temporal HRTF, wherein the second modification factor is greater than 0 and less than 1; and multiplying a fourth modification factor with each impulse response corresponding to the second temporal HRTF to obtain a second target HRTF, wherein the fourth modification factor is greater than 1;

or multiplying a second modification factor with a second high-band impulse response corresponding to the fourth HRTF to obtain a second temporal HRTF, wherein the second modification factor is greater than 0 and less than 1; and multiplying a second value with all impulse responses corresponding to the second temporal HRTF to obtain a sixth target HRTF, wherein the second value is a ratio of a third sum of squares to a fourth sum of squares, the third sum of squares is a sum of squares of all impulse responses corresponding to the fourth HRTF, and the fourth sum of squares is a sum of squares of all impulse responses corresponding to the second temporal HRTF.

* * * * *